(12) United States Patent
Ishii et al.

(10) Patent No.: US 9,179,122 B2
(45) Date of Patent: Nov. 3, 2015

(54) IMAGE TRANSMISSION SYSTEM, IMAGE TRANSMISSION APPARATUS AND IMAGE TRANSMISSION METHOD

(75) Inventors: Junichirou Ishii, Tokyo (JP); Masao Imai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1203 days.

(21) Appl. No.: 13/130,208

(22) PCT Filed: Nov. 24, 2009

(86) PCT No.: PCT/JP2009/069784
§ 371 (c)(1),
(2), (4) Date: May 19, 2011

(87) PCT Pub. No.: WO2010/064557
PCT Pub. Date: Jun. 10, 2010

(65) Prior Publication Data
US 2011/0222559 A1 Sep. 15, 2011

(30) Foreign Application Priority Data

Dec. 4, 2008 (JP) ................................. 2008-309638

(51) Int. Cl.
*H04N 13/00* (2006.01)
*G09G 3/00* (2006.01)
(Continued)

(52) U.S. Cl.
CPC ........... *H04N 13/0048* (2013.01); *G09G 3/003* (2013.01); *G09G 3/3648* (2013.01);
(Continued)

(58) Field of Classification Search
CPC ... G09G 5/00; G09G 3/36; G09G 2310/0237; G09G 3/003; G09G 3/3648; G09G 3/3406; G09G 2310/08; G09G 2300/0809; G09G 2300/0842; G09G 2320/0252; G09G 2340/16; G09G 2358/00; H04N 13/0048; H04N 13/0059
USPC ..................... 348/563; 345/99, 204
See application file for complete search history.

(56) References Cited

U.S. PATENT DOCUMENTS

2005/0259064 A1* 11/2005 Sugino et al. ................. 345/102
2008/0036854 A1* 2/2008 Elliott et al. .................... 348/55

FOREIGN PATENT DOCUMENTS

JP 61-087130 5/1986
JP 61-227498 10/1986
(Continued)

OTHER PUBLICATIONS

International Search report, PCT/JP2009/069784, Feb. 23, 2010.
(Continued)

*Primary Examiner* — Kent Chang
*Assistant Examiner* — Mark Edwards
(74) *Attorney, Agent, or Firm* — Young & Thompson

(57) ABSTRACT

The image transmission system of the present invention is provided with: a time-division display apparatus sequentially displaying first to N-th (N: an integer of 2 or more) images with a frequency above M×N [Hz] (M: an integer of 1 or more) by time division; a multiplexing unit plane-sequentially multiplexing the first to N-th images in accordance with the order of displaying the first to N-th images on the time-division display apparatus; a transmitting unit sending out the multiplexed images which have been multiplexed by the multiplexing unit to a predetermined image transmission path with a frame frequency of M [Hz]; and a receiving unit receiving the multiplexed images from the transmitting unit via the predetermined image transmission path and sequentially transmitting image data of the multiplexed images to the time-division display apparatus.

13 Claims, 30 Drawing Sheets

(51) Int. Cl.
  *G09G 3/36* (2006.01)
  *G09G 3/34* (2006.01)
(52) U.S. Cl.
  CPC ......... *H04N13/0059* (2013.01); *G09G 3/3406* (2013.01); *G09G 2300/0809* (2013.01); *G09G 2300/0842* (2013.01); *G09G 2310/0237* (2013.01); *G09G 2310/08* (2013.01); *G09G 2320/0252* (2013.01); *G09G 2340/16* (2013.01); *G09G 2358/00* (2013.01)

(56) References Cited

FOREIGN PATENT DOCUMENTS

| | | |
|---|---|---|
| JP | 62-191824 | 8/1987 |
| JP | 63-312788 | 12/1988 |
| JP | 63312788 A * | 12/1988 |
| JP | 5-78017 | 10/1993 |
| JP | 7-046631 | 2/1995 |
| JP | 07046631 A * | 2/1995 |
| JP | 9-163408 | 6/1997 |
| JP | 2723371 | 11/1997 |
| JP | 2003-37823 | 2/2003 |
| JP | 2004-336104 | 11/2004 |
| JP | 2006-195018 | 7/2006 |
| JP | 2006-227312 | 8/2006 |
| JP | 2006227312 A * | 8/2006 |
| JP | 2007-192919 | 8/2007 |
| JP | 2010-028261 | 2/2010 |
| WO | WO 20081099737 | 8/2008 |
| WO | WO 2008/117623 | 10/2008 |

OTHER PUBLICATIONS

Japanese Official Action—2010-541296—Nov. 26, 2013.

* cited by examiner

TIMING CHART OF 1ST EXEMPLARY EMBODIMENT (SINGLE-SPEED DISPLAY)

|  |  | CURRENT SUBFRAME (OPERATION-TARGET) IMAGE DATA | | | | | | |
|---|---|---|---|---|---|---|---|---|
|  |  | 0 | 1 | 2 | 3 | ... | 254 | 255 |
| PREVIOUS SUBFRAME (REFERENCE) IMAGE DATA | 0 | 10 | 10 | 11 | 12 | ... | 255 | 255 |
|  | 1 | 10 | 10 | 11 | 11 | ... | 255 | 255 |
|  | 2 | 10 | 10 | 11 | 11 | ... | 255 | 254 |
|  | 3 | 10 | 10 | 10 | 10 | ... | 254 | 254 |
|  | : | : | : | : | : | ... | : | : |
|  | 254 | 0 | 0 | 2 | 3 | ... | 238 | 239 |
|  | 255 | 0 | 0 | 2 | 3 | ... | 236 | 228 |

|  |  | CURRENT SUBFRAME (OPERATION-TARGET) IMAGE DATA | | | | | | | | |
|---|---|---|---|---|---|---|---|---|---|---|
|  |  | 0 | 32 | 64 | 96 | 128 | 160 | 192 | 224 | 255 |
| PREVIOUS SUBFRAME (REFERENCE) IMAGE DATA | 0 | 10 | 18 | 63 | 117 | 150 | 179 | 211 | 235 | 255 |
|  | 32 | 10 | 18 | 63 | 116 | 149 | 179 | 211 | 235 | 251 |
|  | 64 | 9 | 17 | 52 | 99 | 143 | 175 | 207 | 231 | 251 |
|  | 96 | 7 | 13 | 47 | 95 | 135 | 171 | 203 | 227 | 251 |
|  | 128 | 6 | 10 | 39 | 91 | 131 | 163 | 195 | 223 | 251 |
|  | 160 | 2 | 4 | 31 | 83 | 123 | 155 | 187 | 219 | 247 |
|  | 192 | 1 | 2 | 23 | 71 | 107 | 143 | 175 | 211 | 243 |
|  | 224 | 0 | 1 | 15 | 55 | 91 | 127 | 159 | 195 | 235 |
|  | 255 | 0 | 0 | 9 | 31 | 71 | 99 | 127 | 160 | 211 |

PERFORM MULTIPLEXING EVERY 1/60 SECONDS { 1ST FRAME, 2ND FRAME, 3RD FRAME } → MULTIPLEXING UNIT (11) → EXISTING I/F (DVI) TRANSMISSION

PERFORM MULTIPLEXING 3RD FRAME IN ADDITION TO 3 FRAMES (4TH, 5TH AND 6TH FRAMES) EACH OF WHICH CORRESPONDS TO 1/60 SECONDS

IMAGE TRANSMISSION SYSTEM, IMAGE TRANSMISSION APPARATUS AND IMAGE TRANSMISSION METHOD

TECHNICAL FIELD

The present invention relates to an image transmission system, an image transmission apparatus and an image transmission method, and in particular to an image transmission system which transmits multiple images to a time-division display apparatus which displays multiple images by a time-division system, using an image transmission path (image interface) of an existing image transmission standard such as the DVI (Digital Visual Interface), an image transmission apparatus and an image transmission method.

BACKGROUND ART

With the development of recent display techniques, there have been proposed and developed display apparatuses having a function other than a function of displaying a two-dimensional (plane) images. For example, a three-dimensional display which makes it possible to view not a two-dimensional image but a three-dimensional image can be said to be a typical example of such display apparatuses. As one of display apparatuses proposed as the three-dimensional display, there is a time-division three-dimensional display described in Patent Literatures 1 to 3. The principle of the time-division three-dimensional display will be described with reference to FIG. 1.

Referring to FIG. 1, the time-division three-dimensional display displays a left-eye image and a right-eye image constituting a three-dimensional image, switching the images at a high speed. An optical shutter such as liquid crystal glasses is constituted by a right-eye shutter and a left-eye shutter. In synchronization with the right-eye image being displayed, the right-eye shutter gets into a light transmission state and the left-eye shutter gets into a light blocking state. In synchronization with the left-eye image being displayed, the left-eye shutter gets into a light transmission state and the right-eye shutter gets into a light blocking state. When the three-dimensional display is viewed through the optical shutter, different images temporally enter the right and left eyes to realize three-dimensional display.

Another example of the display apparatuses having a function other than the function of displaying a two-dimensional image will be described. Content to be displayed on a display apparatus includes such content that should not be viewed by others, such as secret information and private data. These days when ubiquitous accompanying the development of information equipment is developing, it is an important to prevent display contents from being viewed by others, even among the public that includes an unspecified large number of people. As a related art to solve this problem, there is described an image display apparatus capable of preventing a display image from being stealthily viewed by others in Patent Literature 4. FIG. 2 shows the configuration of the image display apparatus.

Referring to FIG. 2, the image display apparatus described in Patent Literature 4 includes image information accumulation memory 202, synthesis circuit 205, brightness/saturation conversion circuit 206, image display device 208, glasses-shutter timing generation circuit 209, and glasses 211 such as liquid crystal glasses.

Image information accumulation memory 202 stores inputted image signal 201 in frames on the basis of frame signal 203. The image signal stored in image information accumulation memory 202 is read twice at a rate twice as fast as the frame cycle. The image signal read first is provided for synthesis circuit 205 as first image signal 204 compressed to one half. The image signal that is read the second time is provided for synthesis circuit 205 as second image signal 207 after having undergone saturation and brightness conversion processing by brightness/saturation conversion circuit 206. Output of synthesis circuit 205 is provided for image display device 208 as a display signal. Accordingly, an image based on first image signal 204 and an image based on second image signal 207 are alternately displayed on image display device 208.

Glasses-shutter timing generation circuit 209 generates glasses-shutter driving signal 210 for driving the shutter of glasses 211 on the basis of frame signal 203. Glasses-shutter driving signal 210 is a timing signal to cause the shutter of glasses 211 to be turned on (light blocking state) during a period while an image based on second image signal 207 is displayed. By the shutter of glasses 211 being driven by this glasses-shutter driving signal 210, only the image based on first image signal 204 (secret image) are presented to a person who wears glasses 211 can view.

A person who does not wear glasses 211 sees a gray image in which the image based on first image signal 204 and the image based on second image signal 207 are merged, due to the temporal integration effect of eyesight (persistence of vision). This gray image is an image quite different from the image based on first image signal 204 (secret image). Thus, the person who does not wear glasses 211 cannot identify the image based on first image signal 204 (secret image).

In the example shown in FIG. 2, the secret image is shown to a person who wears liquid crystal glasses and not shown to a person who does not wear the liquid crystal glasses. Another example of such images that are related to one another includes, a secret image which can be viewed only by a person who wears liquid crystal glasses, a reverse image to negate the secret image and make the secret image appear to be an image quite unrelated to the secret image, and a public image to be viewed by a person who does not wear the liquid crystal glasses. In this example, in order to prevent both of the persons who wears and who does not wear the liquid crystal glasses from perceiving flickers, it is required that the cycle of displaying the set of three images of the secret image, the reverse image and the public image should be 60 Hz or more, that is, the frame frequency for displaying each unit image (subframe) of the secret image, the reverse image and the public image should be 180 Hz or more, in consideration of the time integration effect in human eyesight. If an image is displayed with a frame frequency lower than 180 Hz, the image is easily perceived as flicker by human eye, and thus, there is a problem that the image quality deteriorates. Furthermore, if an image is displayed with a frame frequency lower than 180 Hz, each secret image, the reverse image and public image appear to be independently displayed, and consequently, even the person who does not wear the liquid crystal glasses can view the secret image. Thus, there is a problem that the secrecy of the secret image deteriorates.

In order to prevent flicker, it is required, in the example shown in FIG. 2, to combine a secret image and a gray image as a set and set the frequency for displaying the set to 60 Hz or more similarly and, in the example of the three-dimensional shown in FIG. 1, to combine a right-eye image and a left-eye image as a set and set the frequency for displaying the set to 60 Hz or more similarly. In these cases, it is necessary to display each unit image (subframe) with a frame frequency of 60×2=120 Hz.

Thus, in order to realize a display apparatus utilizing the time integration effect of eyesight, it is required to display a unit image (subframe) constituting a frame, such as the secret image and the right-eye image, with a high-speed frame frequency of 120 Hz or more. To achieve this, it is desirable to, when transmitting these images to a display apparatus from an image transmission source (a PC (Personal Computer) or the like), transmit them with the same frame frequency as the high-speed frame frequency, such as 120 Hz and 180 Hz.

However, in image transmission standards which are currently widely prevalent, such as the DVI, the limit of the frame frequency capable of transmitting an image is practically 60 Hz. Therefore, it is not possible to transmit an image with a frame frequency more than 60 Hz. As measures for transmitting an image with a frame frequency more than 60 Hz, measures of devising a new image transmission system compatible with the high-speed frame frequency as described above and measures of parallelizing existing image transmission paths are conceivable.

However, the former measures have a problem that the versatility is low because of the specialization in high-speed transmission, in addition to the problem of the enormous cost of new development of compatible chips (for a transceiver and a receiver) and cables. The latter measures have a problem in which the wiring of cables is complicated. Therefore, neither measure can be said to be a realistic solution. Thus, it is desirable to transmit an image using only one image transmission path of an existing image transmission standard.

As an example of related art to realize this, the technique described in Patent Literature 5 can be given (FIG. 3). This technique relates to a technique of transmitting an image to a display apparatus which displays a three-dimensional image by a system different from the time-division system as shown in FIG. 1. In the technique described in Patent Literature 5, two-dimensional image 301 and depth image 302 are multiplexed to one large image by multiplexing means 312, and the multiplexed image is transmitted to a display apparatus with the use of an existing one two-dimensional image transmission path, as shown in FIG. 3. On the display apparatus side, separation means 313 separates the multiplexed image into two-dimensional image 301 and depth image 302.

CITATION LIST

Patent Literature

Patent Literature 1: JP05-78017B
Patent Literature 2: JP61-227498A
Patent Literature 3: JP61-87130A
Patent Literature 4: JP63-312788A
Patent Literature 5: JP2006-195018A

SUMMARY OF INVENTION

Technical Problem

However, in the time-division display apparatus which displays multiple images by a time-division system, as shown in FIG. 1, the frame frequency at the time of displaying an image (for example, 120 Hz in the case of two subframes and 180 Hz in the case of three subframes) differs from the frame frequency at the time of transmitting an image, which is specified in an existing image transmission standard (for example, 60 Hz in the DVI).

Therefore, in the case of applying the technique described in Patent Literature 5 to transmit multiple images to a time-division display apparatus, there is a problem, on the time-division display apparatus side, that a frame memory for converting the speed is required, which leads to an increase in the cost.

Thus, the problem to be solved by the present invention is to realize a time-division display at a low cost by, when transmitting multiple images to be displayed on a time-division display apparatus using one image transmission path of an existing image transmission standard and displaying a certain subframe on the time-division display apparatus, absorbing the difference between the frame frequency of the existing image transmission standard and the frame frequency at the time of displaying the subframe on the time-division display apparatus and thereby eliminating the necessity of a frame memory required for speed conversion.

Thus, the object of the present invention is to provide an image transmission system, an image transmission apparatus and an image transmission method to solve the above problem.

Solution to Problem

A first image transmission system of the present invention is provided with:

a time-division display apparatus that sequentially displays first to N-th (N: an integer of 2 or more) images with a frequency above M×N [Hz] (M: an integer of 1 or more) by time division;

a multiplexing unit that plane-sequentially multiplexes the first to N-th images in accordance with the order of displaying the first to N-th images on the time-division display apparatus;

a transmitting unit that sends out the multiplexed images which have been multiplexed by the multiplexing unit to a predetermined image transmission path with a frame frequency of M [Hz]; and a receiving unit that receives the multiplexed images from the transmitting unit via the predetermined image transmission path and sequentially transmits image data of the multiplexed images to the time-division display apparatus.

A second image transmission system of the present invention is provided with:

a time-division display apparatus that sequentially displays first to N-th (N: an integer of 2 or more) images with a frequency above M×N [Hz] (M: an integer of 1 or more) by time division;

a multiplexing unit that multiplexes the first to N-th images and the N-th image of a frame immediately before the frame which includes the first to N-th images as subframes;

a transmitting unit that sends out the multiplexed images which have been multiplexed by the multiplexing unit to a predetermined image transmission path with a frame frequency of M [Hz];

a receiving unit that receives the multiplexed images from the transmitting unit via the predetermined image transmission path; and an overdrive operation unit that inputs an image to be displayed on the time-division display apparatus at a predetermined hour, performs overdrive operation by referring to an image displayed on the time-division display apparatus at an hour one subframe earlier than the predetermined time, and sequentially transmits image data obtained by the overdrive operation to the time-division display apparatus.

A first image transmission apparatus of the present invention is:

an image transmission apparatus transmitting first to N-th (N: an integer of 2 or more) images to a time-division display apparatus which sequentially displays the first to N-th images, with a frequency of M×N [Hz] (M: an integer of 1 or more) by time division, the image transmission apparatus comprising:

a multiplexing unit that plane-sequentially multiplexes the first to N-th images in accordance with the order of displaying the first to N-th images on the time-division display apparatus; and a transmitting unit that transmits the multiplexed images which have been multiplexed by the multiplexing unit to the time-division display apparatus via a predetermined image transmission path with a frame frequency of M [Hz].

A second image transmission apparatus of the present invention is:

an image transmission apparatus transmitting first to N-th (N: an integer of 2 or more) images to a time-division display apparatus which sequentially displays the first to N-th images, with a frequency of M×N [Hz] (M: an integer of 1 or more) by time division, the image transmission apparatus comprising:

a multiplexing unit that multiplexes the first to N-th images and the N-th image of a frame immediately before the frame which includes the first to N-th images as subframes; and a transmitting unit that transmits the multiplexed images which have been multiplexed by the multiplexing unit to the time-division display apparatus via a predetermined image transmission path with a frame frequency of M [Hz].

A first image transmission method of the present invention is:

a method by an image transmission apparatus transmitting first to N-th (N: an integer of 2 or more) images to a time-division display apparatus which sequentially displays the first to N-th images, with a frequency of M×N [Hz] (M: an integer of 1 or more) by time division, the method comprising:

a multiplexing step of plane-sequentially multiplexing the first to N-th images in accordance with the order of displaying the first to N-th images on the time-division display apparatus; and a transmission step of transmitting the multiplexed images which have been multiplexed by the multiplexing unit to the time-division display apparatus via a predetermined image transmission path with a frame frequency of M [Hz].

A second image transmission method of the present invention is:

A method by an image transmission apparatus transmitting first to N-th (N: an integer of 2 or more) images to a time-division display apparatus which sequentially displays the first to N-th images, with a frequency of M×N [Hz] (M: an integer of 1 or more) by time division, the method comprising:

a multiplexing step of multiplexing the first to N-th images and the N-th image of a frame immediately before the frame which includes the first to N-th images as subframes; and a transmission step of transmitting the multiplexed images which have been multiplexed by the multiplexing unit to the time-division display apparatus via a predetermined image transmission path with a frame frequency of M [Hz].

Advantageous Effects of Invention

In the first image transmission system of the present invention, for a time-division display apparatus which sequentially displays first to N-the images with a frequency of M×N [Hz] or more by time division, the first to N-th images are plane-sequentially multiplexed in accordance with the order in which they are displayed on the time-division display apparatus, and the multiplexed image is transmitted with the frame frequency of M [Hz] via a predetermined image transmission path.

In the second image transmission system of the present invention, first to N-th images and the N-th image of an immediately previous frame are multiplexed; the multiplexed image is transmitted with the frame frequency of M [Hz] via a predetermined image transmission path; overdrive operation is performed for this image on the basis of a reference image displayed in an immediately previous subframe; and the operated image data is transferred to a time-division display apparatus similar to the above.

Thus, according to the first and second image transmission systems of the present invention, the time-division display apparatus does not require a frame memory for absorbing the difference between the frame frequency at the time of displaying an image and the frame frequency at the time of transmitting the image, which is specified in an existing image transmission standard. Furthermore, since it is possible to transmit an image using an image transmission path of an existing image transmission standard, an existing transmission apparatus, receiving apparatus, and transmission media such as cables can be used as they are. Thus, an advantage can be obtained in which time-division display can be realized at a low cost.

Furthermore, according to the second image transmission system of the present invention, since it is possible to compensate for the response delay of liquid crystal in the case where a time-division display apparatus is configured by a liquid crystal panel by performing overdrive operation, an advantage can be obtained in which more accurate and higher-image-quality gradation display is enabled.

DESCRIPTION OF EMBODIMENTS

Exemplary embodiments for practicing the present invention will be described below with the use of drawings.

In the present invention, multiple images are transmitted from an image transmission source to a time-division display apparatus with the use of one image transmission path in accordance with an existing image transmission standard, and the multiple images are displayed by time division on the time-division display apparatus.

Here, as for the kind of the images to be transmitted, images of multiple systems or moving images with a frequency equal to or above the frame frequency specified in an existing image transmission standard (hereinafter referred to as "a high-speed moving image") are possible.

The images of multiple systems may be images related to one another, such as those for a three-dimensional image, or images unrelated to one another, such as those for multiple TV channels.

The existing image transmission standard may be, for example, the DVI, the HDMI (High-Definition Multimedia Interface) or the DisplayPort or may be the Analog RGB (VGA (Video Graphics Array)). In these image transmission standards, the frame frequency capable of transmitting an image is basically 60 Hz. The HDMI and the DisplayPort, however, are compatible with the frame frequency up to 120 Hz according to the standards as of Jun. 19, 2008.

Figure 1:
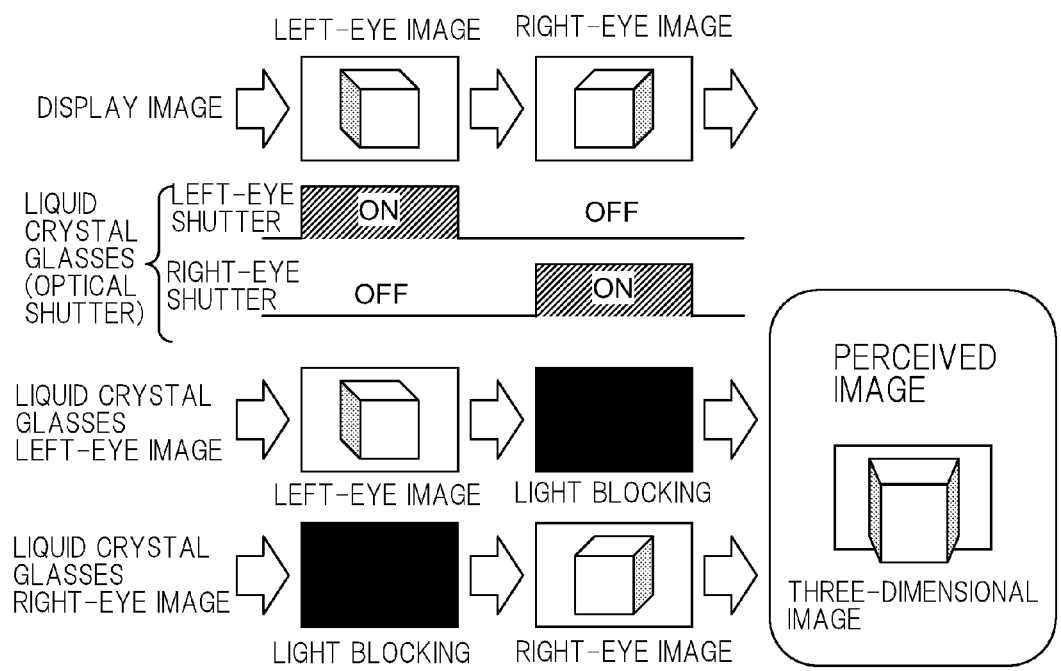
FIG. 1 is a diagram showing an example of a related time-division three-dimensional display.
Figure 2:
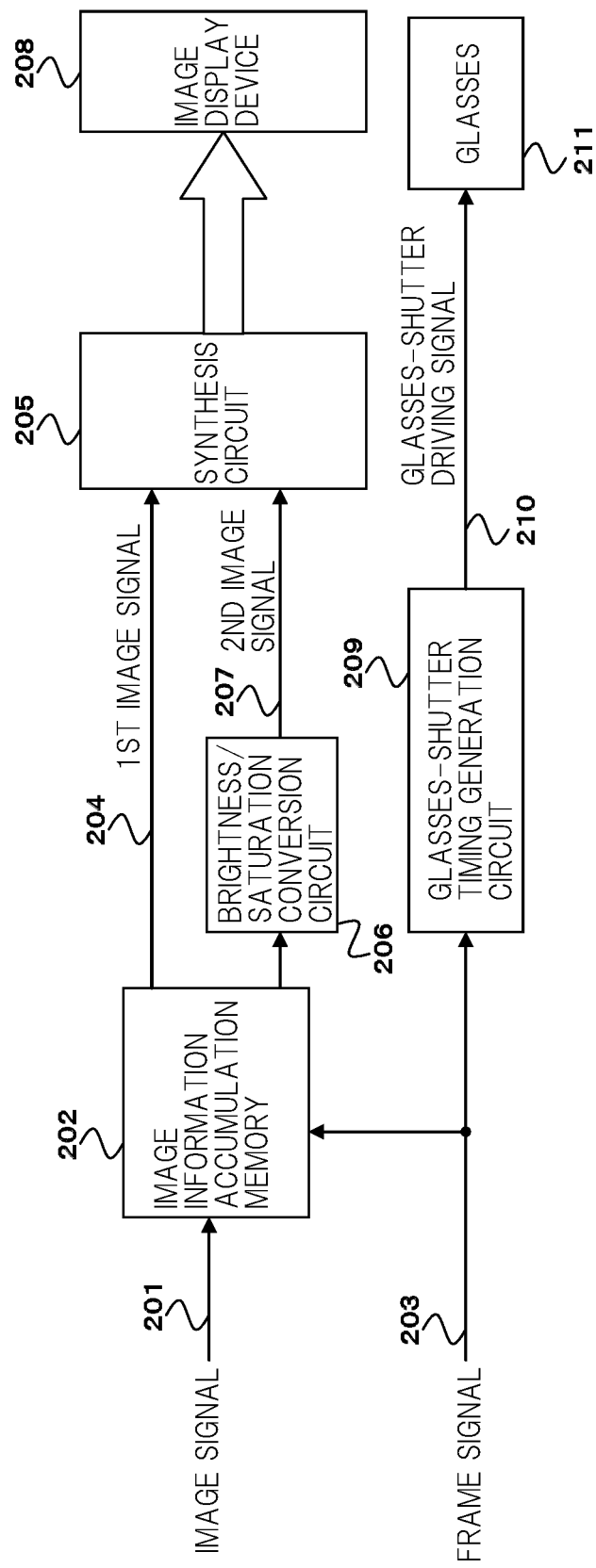
FIG. 2 is a block diagram of an example of a related image display apparatus.
Figure 3:
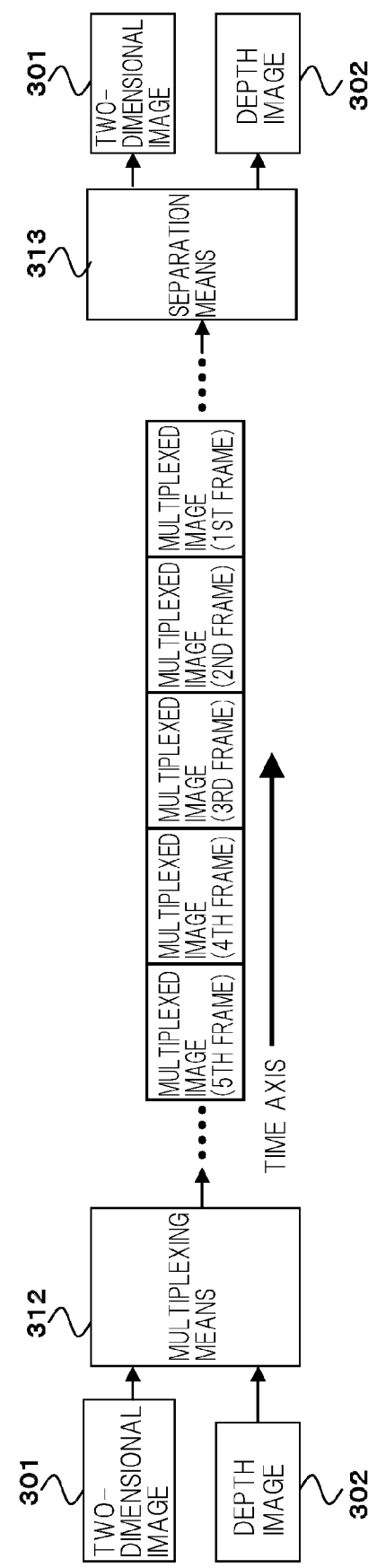
FIG. 3 shows an example of related art in which multiple images are transmitted with the use of a two-dimensional image transmission path.
Figure 4:
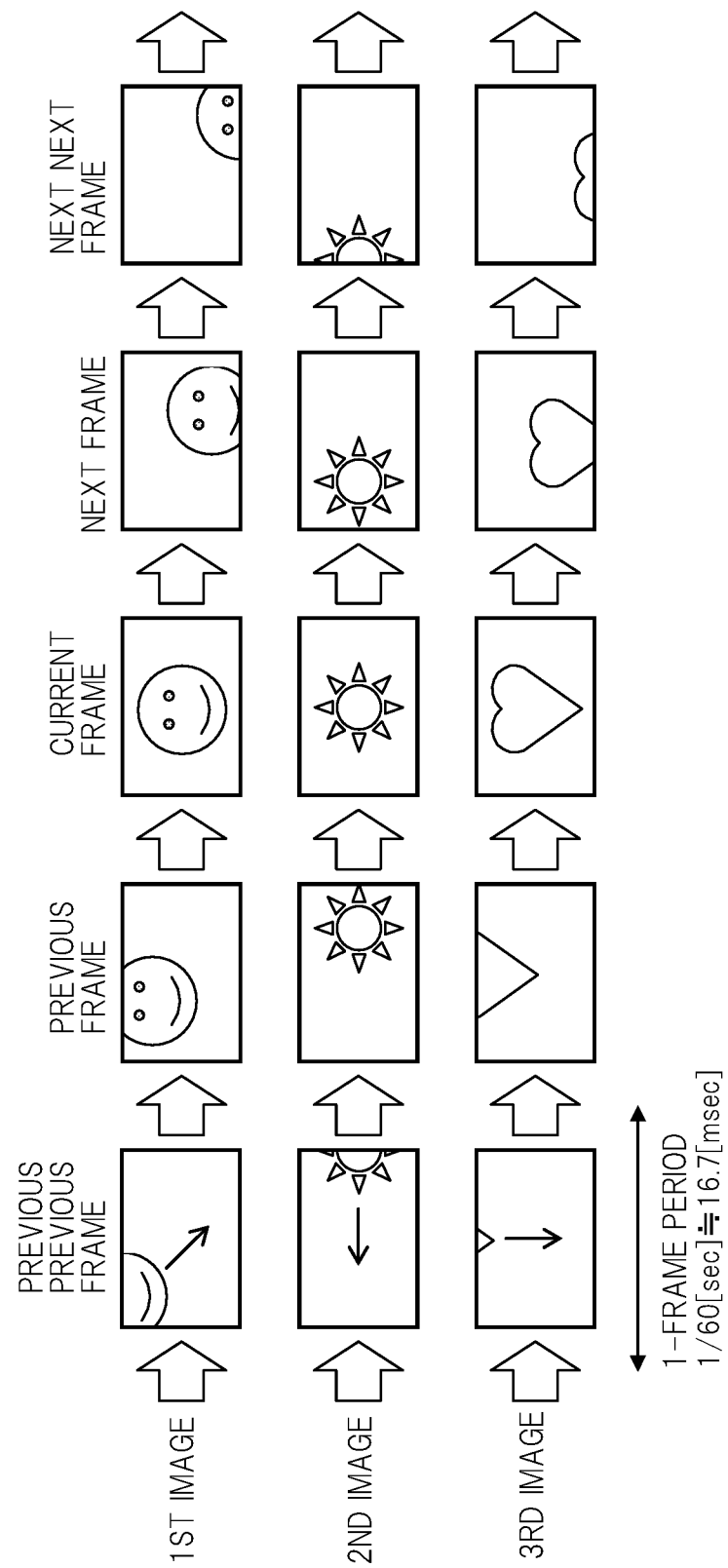
FIG. 4 is a diagram showing images of three systems, which are examples of multiple images transmitted according to the present invention.

In the description below and the drawings, it is assumed that multiple images to be transmitted/displayed are images of three systems including first to three images, as shown in FIG. 4, and that each of the first to third images is a moving image or a still image of 800 pixels×600 lines. Frames, each of which are constituted by the first to third images as unit images (subframes), are referred to as a previous previous frame, a previous frame, a current frame, a next frame and a next next frame according to the order in which they are transmitted. The second image of the next frame is abbreviated as "next 2", and the first image of the previous previous frame is abbreviated as "previous previous 1".

It is also assumed that the DVI is used as the existing image transmission standard, and that the frame frequency at the time of transmitting an image is 60 FPS (frame/second). However, it goes without saying that the present invention is not limited to the DVI, and other existing image transmission standards are also applicable.

Figure 5:
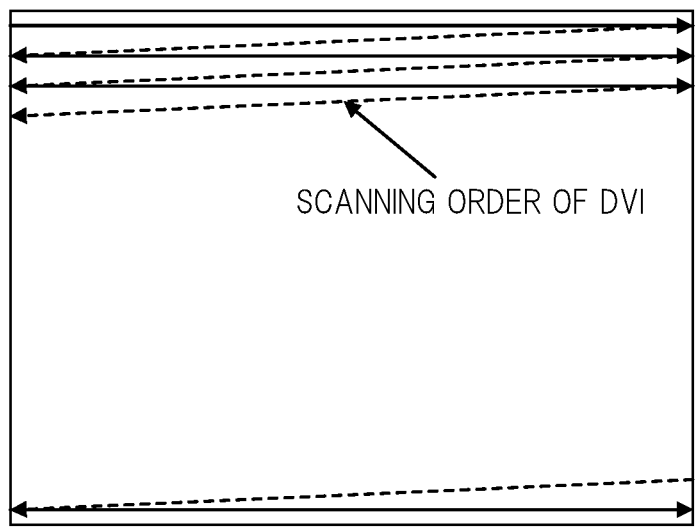
FIG. 5 is a diagram showing transmission order (scanning order) in the case of transmitting multiple images in accordance with the DVI standard.

As for the order of transmitting image data of the pixels of one image in the DVI, it is assumed that the image data are dot-sequentially transmitted from the upper left to the lower right of the image as shown in FIG. 5.

Figure 6:
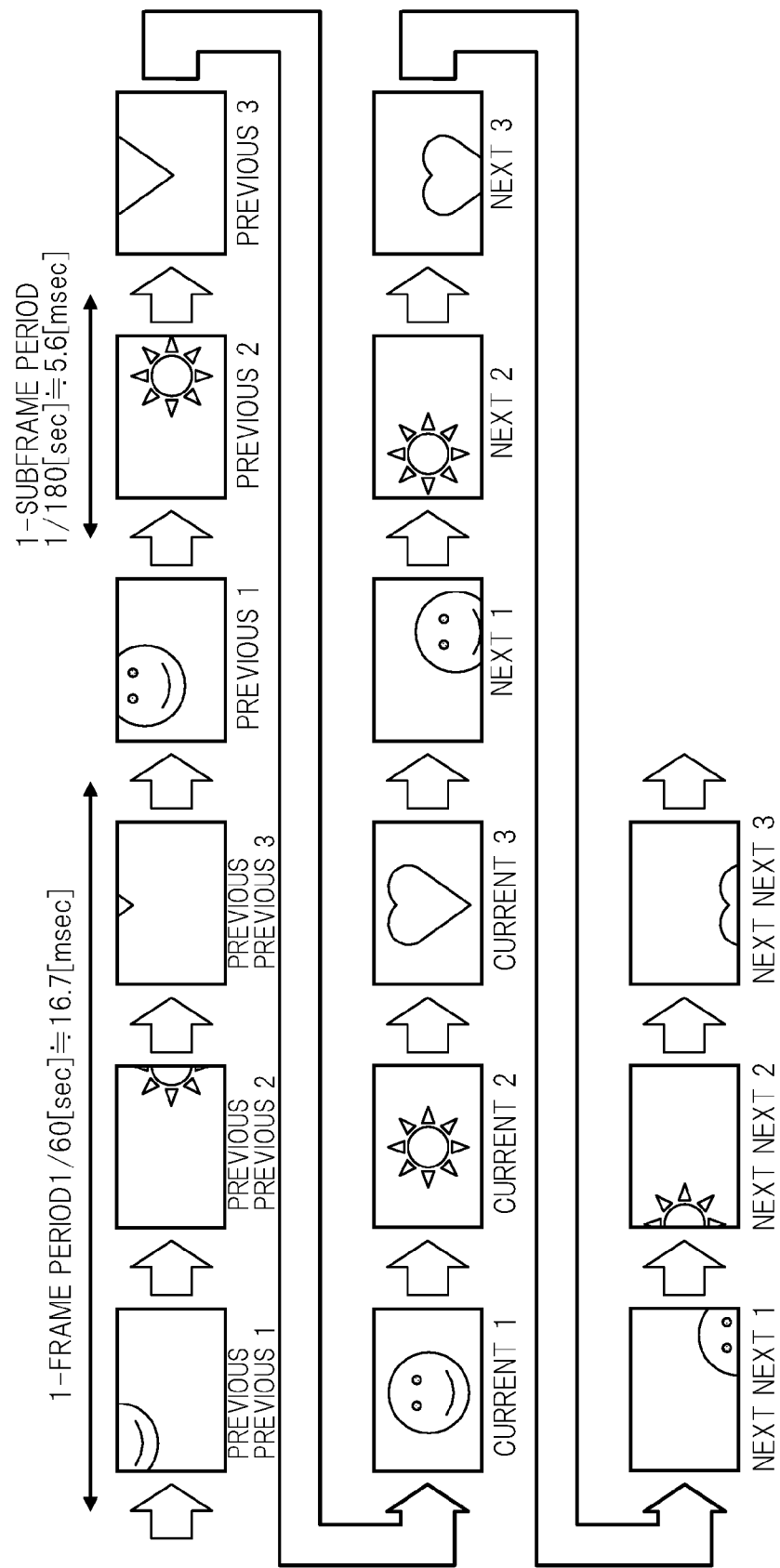
FIG. 6 is a diagram showing the display order in the case of displaying the images of three systems in FIG. 4 on a time-division display apparatus.

It is also assumed that the time-division display apparatus displays the first to third image of the same frame at 60 FPS, as shown in FIG. 6. That is, a subframe such as previous 1 is displayed at 60×3=180 FPS. It is assumed that the order of displaying the subframes is: previous previous 1→previous previous 2→previous previous 3→previous 1→previous 2→previous 3→current 1→current 2→current 3→next 1→next 2→next 3→next next 1→next next 2→next next 3→ . . . as shown in FIG. 6; and that scanning starts at the top of the image and advances downward in any of the subframes.

First Exemplary Embodiment

Image Transmission System: First Configuration

Figure 7:
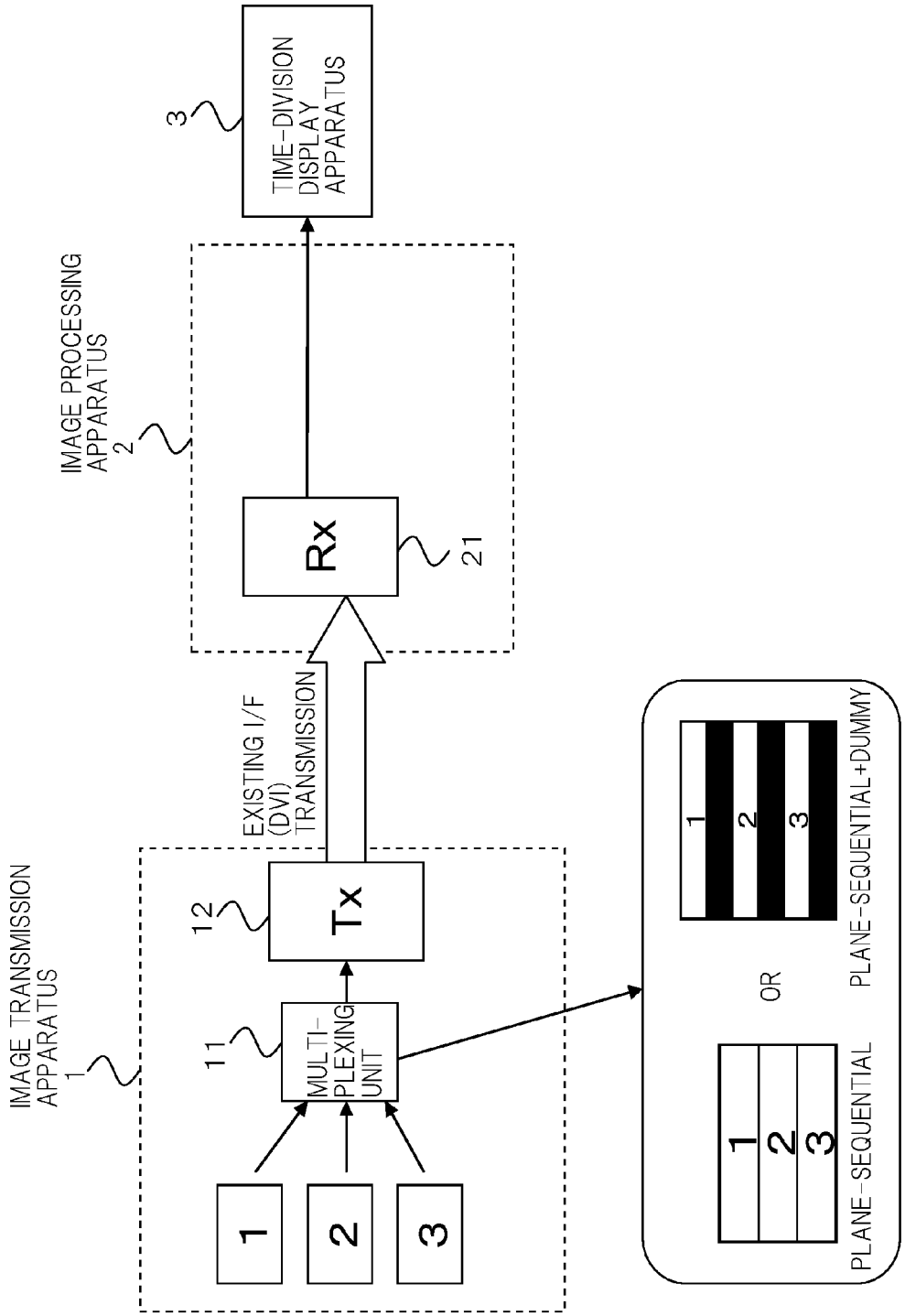
FIG. 7 is a block diagram of an image transmission system of a first exemplary embodiment.

FIG. 7 shows the configuration of an image transmission system in this exemplary embodiment.

The image transmission system in this exemplary embodiment includes image transmission apparatus 1, image processing apparatus 2 and time-division display apparatus 3.

Image transmission apparatus 1 includes multiplexing unit 11 which multiplexes images of three systems (a first image, a second image and a third image) into one large image, and image transmitting unit (transceiver: Tx) 12 which transmits the image data of the multiplexed image to image processing apparatus 2 as a DVI-format signal. It is assumed that the multiplexing method by multiplexing unit 11 is plane-sequential.

Image processing apparatus 2 includes at least image receiving unit (receiver: Rx) 21 which receives the image data of an image from image transmission apparatus 1.

Timing Chart

First Example

Figure 8:
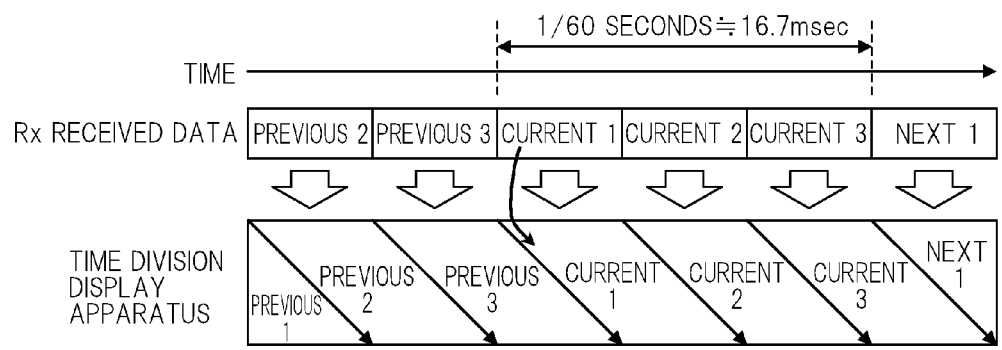
FIG. 8 is a timing chart in the first exemplary embodiment.

FIG. 8 shows a timing chart in this exemplary embodiment.

Image data received by image receiving unit 21 is immediately transferred to time-division display apparatus 3, and time-division display apparatus 3 plane-sequentially displays the first image, the second image and the third image.

<Multiplexing Method: Plane-Sequential>

The multiplexing method in this exemplary embodiment will be described.

In this exemplary embodiment, multiplexing unit 11 of image transmission apparatus 1 spatially multiplexes the first to third images into one large image (multiplexed image: 800 pixels×1800 lines).

Multiplexing unit 11 may be configured by hardware such as an LSI (Large Scale Integration) and an FPGA (Field Programmable Gate Array) or may be realized by software.

Figure 9:
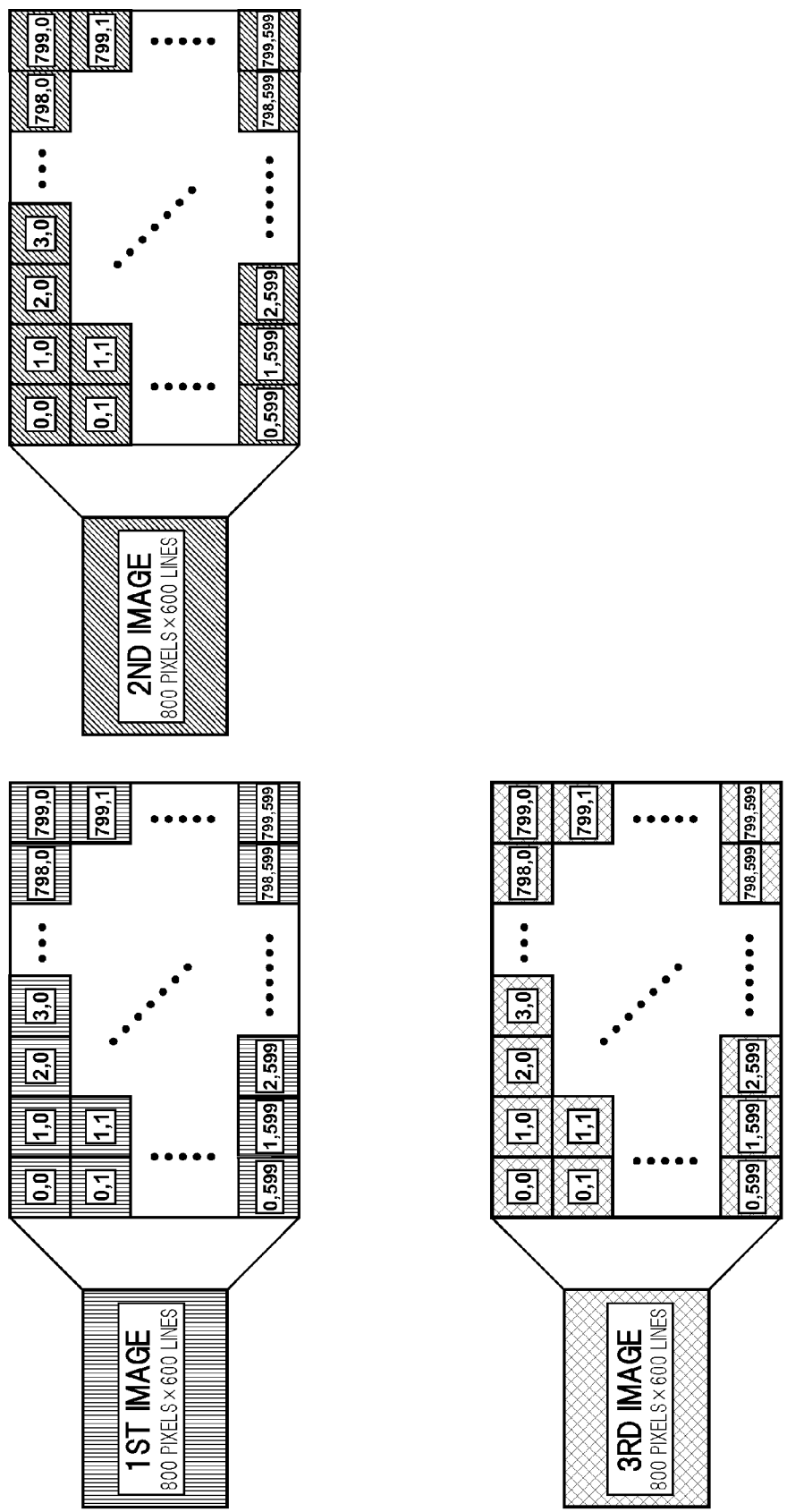
FIG. 9 is a diagram showing the coordinates of the images of three systems transmitted in the first exemplary embodiment.

As shown in FIG. 9, each of the first to third images is an image of 800 pixels×600 lines, and it is assumed that the coordinates at the upper left and the lower right of the image are (0, 0) and (799, 599), respectively.

Figure 10:
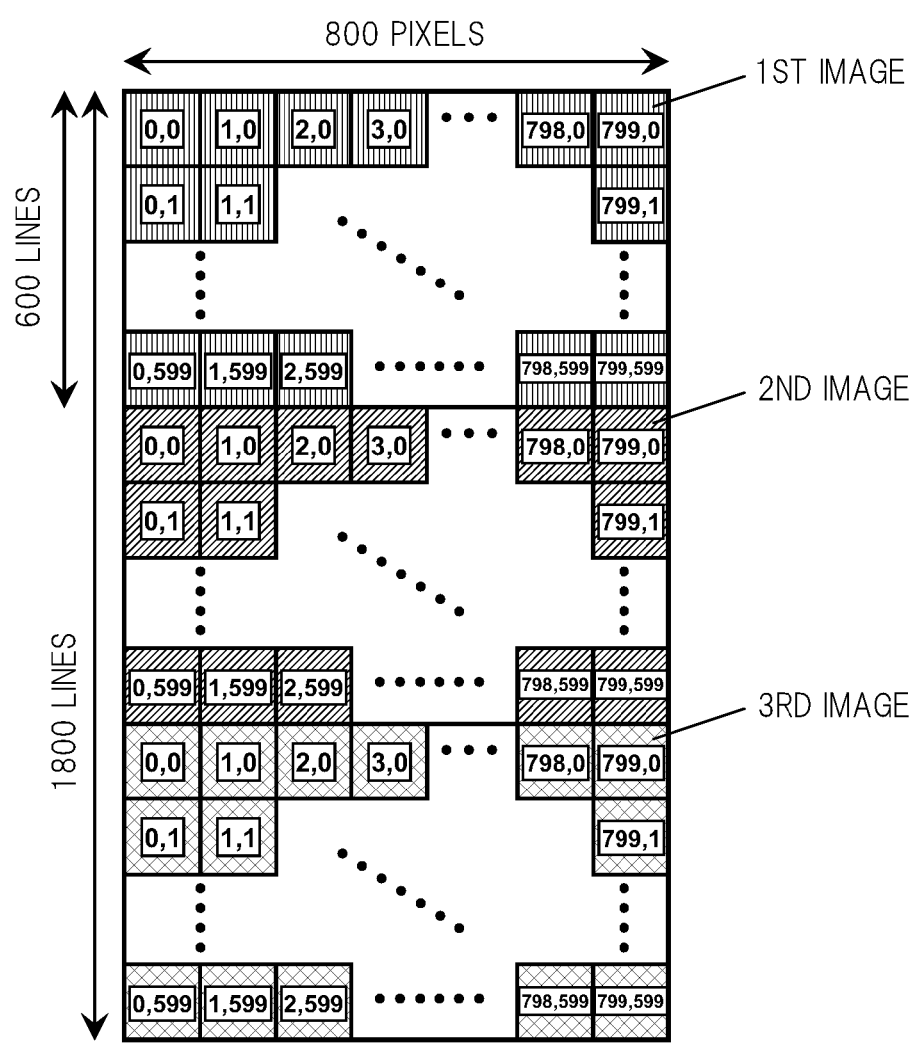
FIG. 10 is a diagram showing a plane-sequential multiplexing method in the first exemplary embodiment.

As shown in FIG. 10, the first to third images (such as previous previous 1, previous previous 2 and previous previous 3) in temporally the same frame are plane-sequentially multiplexed in accordance with the display order and the scanning order in time-division display apparatus 3.

For example, in the case where the first to third images are displayed in the order of the first image→second image→third image→ . . . and are dot-sequentially or line-sequentially scanned and displayed from the top of each of the images downward in time-division display apparatus 3, the multiplexed image is an image in which the first image, second and third images are arranged in that order from the top as shown in FIG. 10. In the case where the scanning order in time-division display apparatus 3 is from the bottom of each image upward, the multiplexed image is an image in which the first image, the second image and the third image are arranged in that order from the top in a state of being upside down. Similarly, in the case where the scanning order in time-division display apparatus 3 is an interlaced order, the images can be interlacedly arranged similarly.

Thereby, the image data of the first to third images are transmitted in accordance with the display order/scanning order of time-division display apparatus 3.

Figure 11:
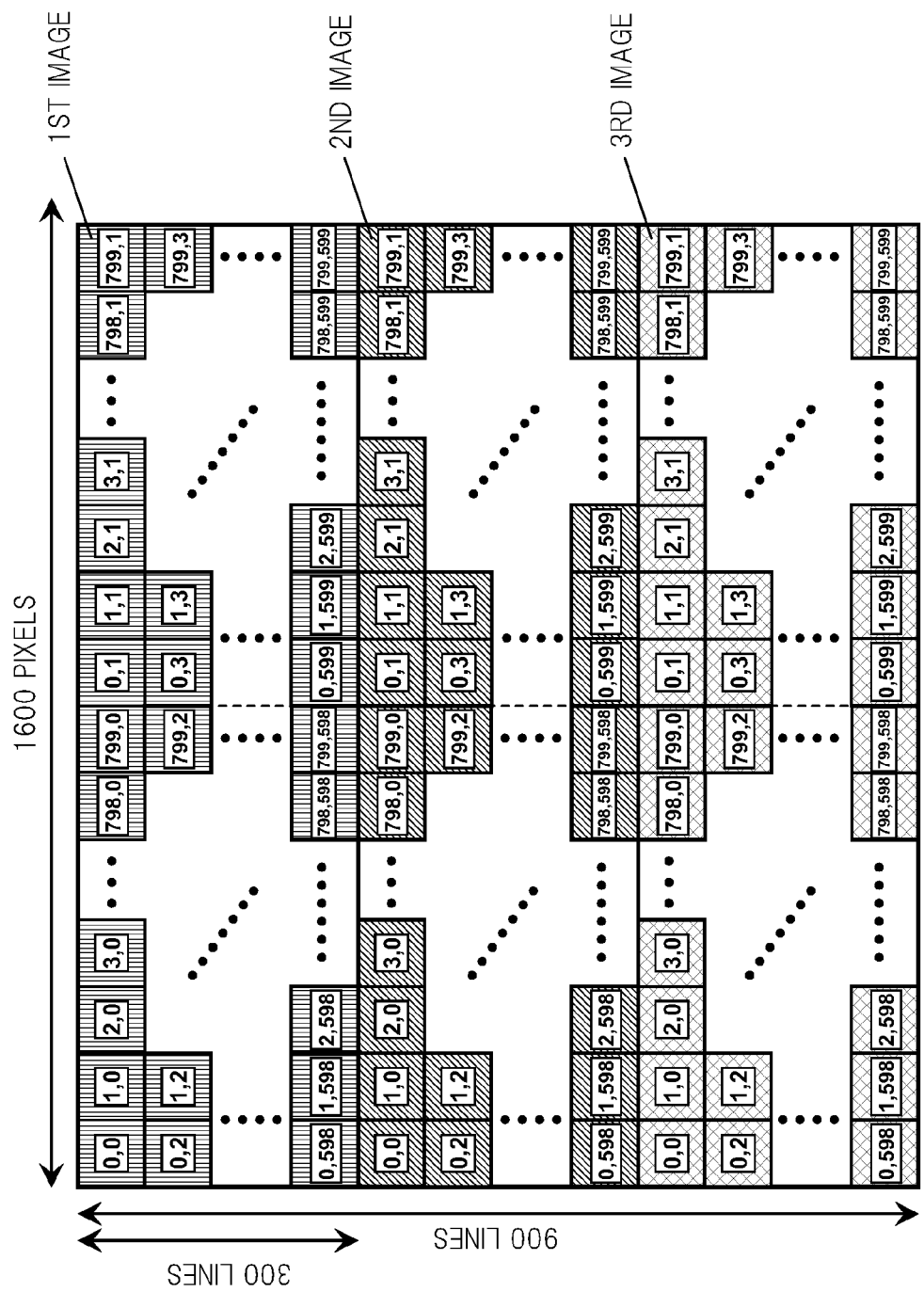
FIG. 11 is a diagram showing another plane-sequential multiplexing method in the first exemplary embodiment.

As described above, it is important to, when plane-sequentially multiplexing the first to third images, arrange/transmit the first to third images in accordance with the display order/scanning order of time-division display apparatus 3. It is sufficient if the display order/scanning order of time-division display apparatus 3 and the transmission order of the DVI are the same. Therefore, it is also possible to multiplex the images not in an image of 800 pixels×1800 lines as shown in FIG. 10 but in an image of 1600 pixels×900 lines as shown in FIG. 11. It should be noted that the image transmission order in FIG. 11 is quite the same as the transmission order in FIG. 10.

<Example of Time-Division Display Apparatus>

Figure 12:
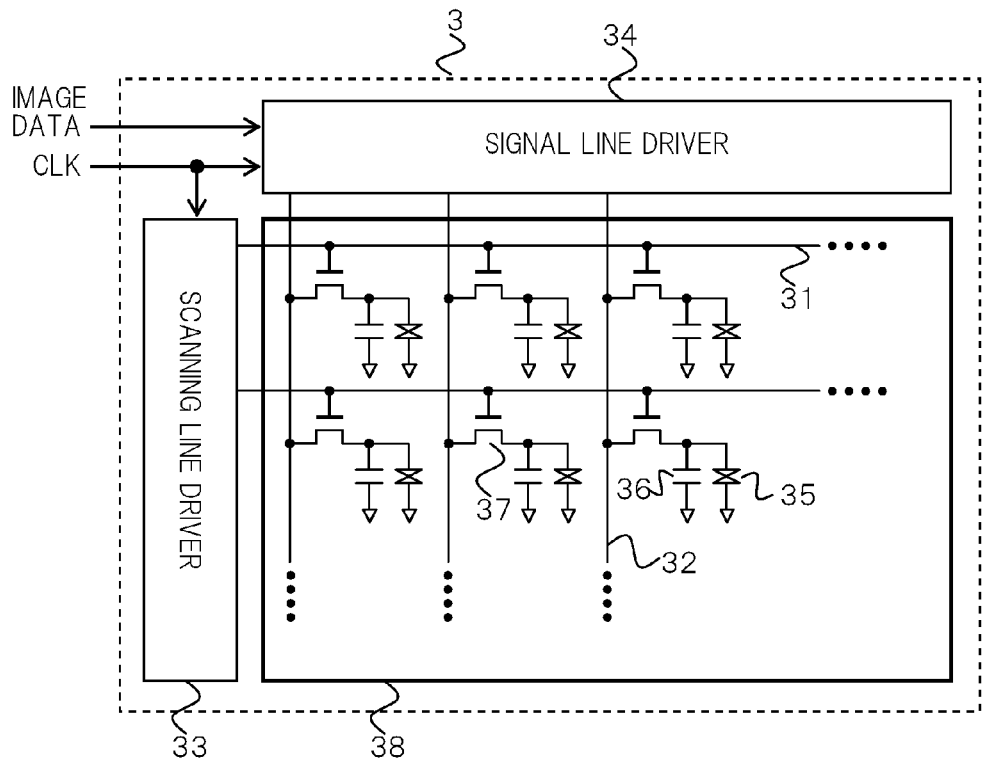
FIG. 12 is a block diagram of an example of a time-division display apparatus using a liquid crystal panel.

FIG. 12 shows the configuration using a liquid crystal panel as an example of time-division display apparatus 3.

The liquid crystal panel part of time-division display apparatus 3 includes at least multiple scanning lines 31 and multiple signal lines 32 intersecting with one another, scanning line driver 33 for controlling a signal to be inputted to multiple scanning lines 31, signal line driver 34 for controlling a signal to be inputted to multiple signal lines 32, multiple liquid crystal pixels 35 and multiple accumulation capacities 36 which are provided at positions of intersections by scanning lines 31 and multiple signal lines 32 in a matrix shape, liquid crystal pixel 35 and accumulation capacity 36 being parallel connected with each other, and multiple thin film transistors (TFTs) 37 provided to correspond to multiple liquid crystal pixels 35 and multiple accumulation capacities 36. It is assumed that one pixel is constituted by one liquid crystal pixel 35, one accumulation capacity 36 and one TFT 37. An area where an image constituted by liquid crystal pixels 35 is actually displayed is referred to as effective display area 38. In addition to the liquid crystal panel described above, time-division display apparatus 3 is also provided with a backlight (not shown) for illuminating the liquid crystal panel. An optical shutter is used to view an image displayed on time-division display apparatus 3.

On/off of TFT 37 having a switching function is controlled by a scanning signal of scanning line driver 33. When TFTs 37 are turned on, a gradation voltage corresponding to image data is applied to accumulation capacities 36 and liquid crystal pixels 35 by signal line driver 34. This voltage is maintained by accumulation capacities 36 for a predetermined period. The transmittance of liquid crystal pixels 35 is changed by the application of this voltage, and light from the backlight not shown is transmitted through liquid crystal pixels 35. Thereby, an image is displayed. As for the order of scanning line driver 33 selecting one line, it is assumed that line-by-line selection from the top of the screen downward is made. However, selection may be made from the bottom upward or every-other-line selection may be made. At this time, image data can be provided for signal line driver 34 in the order selected by scanning line driver 33.

Figure 13:
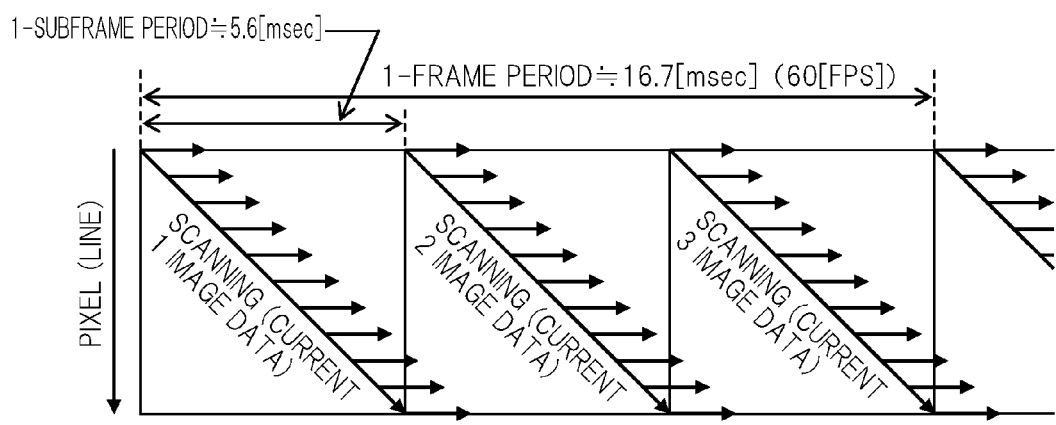
FIG. 13 is a timing chart in the time-division display apparatus in FIG. 12.

FIG. 13 shows an example of a timing chart during a one-frame period in time-division display apparatus 3 in FIG. 12.

Time-division display apparatus 3 displays each of the transmitted first to third images once during a one-frame period (1/60≈16.7 msec). That is, each subframe is displayed during a period corresponding to one-third of one frame, that is, for 5.6 msec.

In the example in FIG. 13, the order of scanning and displaying the first to third images is: the first image→second image→third image. However, other orders are possible. However, when the display order is changed for each frame, the frame frequency for each subframe, such as the first image, may be below 60 FPS even if the frame frequency is 60 FPS. In this case, there is a possibility that the images are perceived as flicker to the human eye. Therefore, it is desirable to display the images in the same order for any frame. However, in the case where the frame frequency is high, and the frequency for each subframe can be 60 FPS or more even if the order is changed, the above does not apply.

Thus, the first to third images are displayed by time division.

Figure 14:
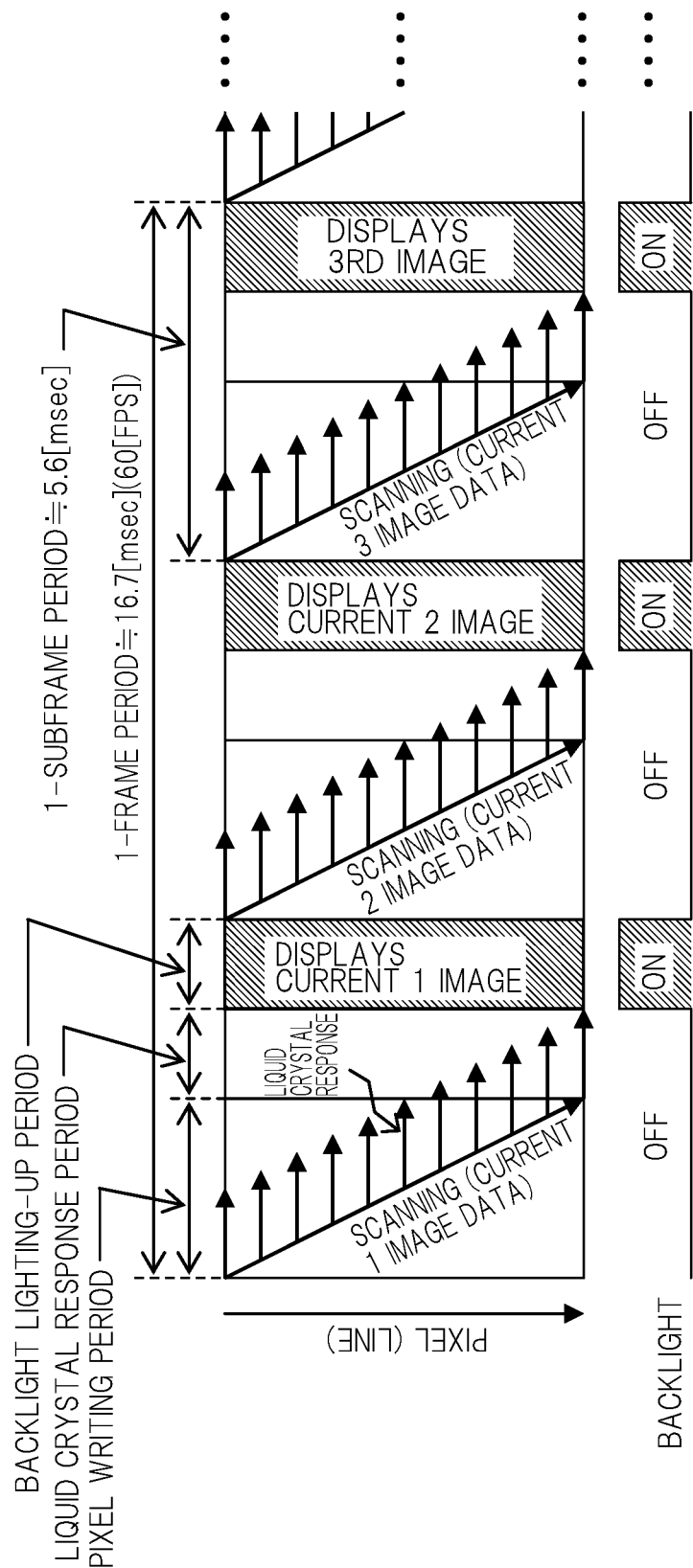
FIG. 14 is a timing chart in the case of performing backlight blinking in the time-division display apparatus in FIG. 12.

FIG. 14 shows an example of another timing chart during a one-frame period in time-division display apparatus 3 in FIG. 12.

In the example in FIG. 13, since an image is always scanned and displayed, there is caused a phenomenon in which an image other than a desired image is partly seen (cross talk) when any one of the first to third images is taken out and viewed by temporally turning on/off the optical shutter (not shown) such as liquid crystal glasses.

To cope with this, so-called backlight blinking driving is performed in the example in FIG. 14 in which scanning (applying gradation voltage to pixels and writing image data) is performed during a period shorter than a one-subframe period and a response from each liquid crystal pixel 35 is waited for before turning on the backlight. That is, since the backlight is turned on after waiting for responses from liquid crystal pixels 35 after scanning one image, there is an advantage that, when any of the images is temporally taken out and viewed through the optical shutter, a favorable image without cross talk can be viewed.

Furthermore, the example in FIG. 14 is similar to an impulse-type display such the display of a CRT (Cathode Ray Tube) though the example in FIG. 13 is hold-type display. Therefore, there is also an advantage that, in the case of displaying a moving image with active movement, a clear image with little blur can be provided.

However, in the backlight blinking driving shown in FIG. 14, the quality is improved, while scanning (writing to pixels) must be done at double the speed in comparison with the example in FIG. 13. Scanning lines 31 and signal lines 32 are formed by conductors made of a compound such as chrome (Cr) and aluminum (Al). Both of the lines appear to be a load constituted by a resistance component and a capacity component when seen from scanning line driver 33 or signal line driver 34 because their signal line length is very long in comparison with the signal line width. Liquid crystal pixels 35 themselves are grasped as forming a load constituted by the resistance component of TFT 37 and accumulation capacity 36. Therefore, when the scanning speed increases, it becomes impossible to drive these resistance/capacity loads, which leads to various problems such as image quality deterioration.

Figure 15:
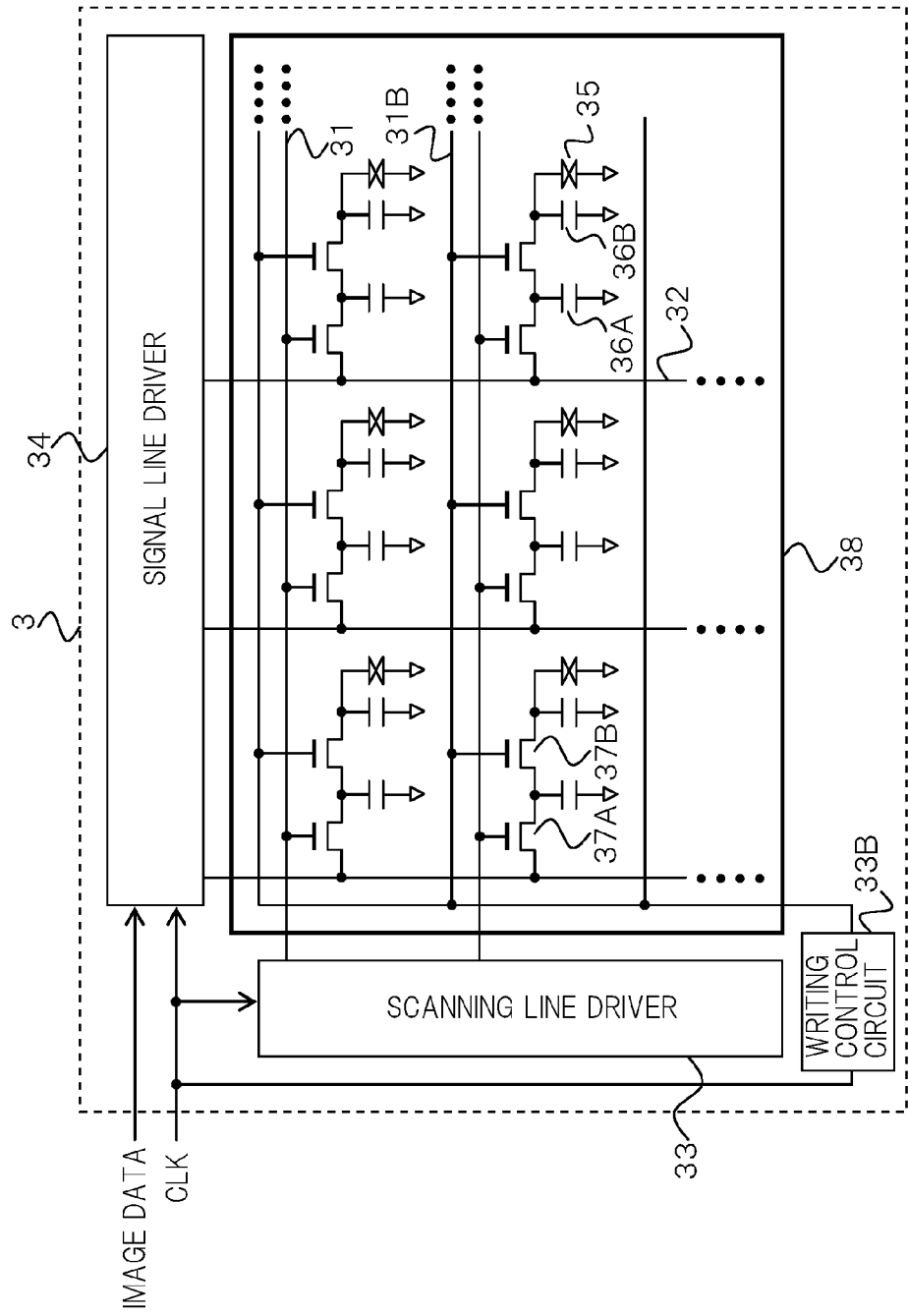
FIG. 15 is a block diagram of another example of the time-division display apparatus using the liquid crystal panel.

FIG. 15 shows the configuration of time-division display apparatus 3 which solves this problem, that is, which realizes backlight blinking driving without increasing the scanning speed.

Differences between the configurations in FIGS. 12 and 15 are: there are two TFTs (37A and 37B) and two accumulation capacities (36A and 36B) that constitute one pixel; TFTs 37B adjacent to liquid crystal pixels 35 are turned on/off together all over the screen not by scanning line driver 33 but by writing control circuit 33B. Here, writing control circuit 33B may be included in scanning line driver 33 or signal line driver 34.

Figure 16:
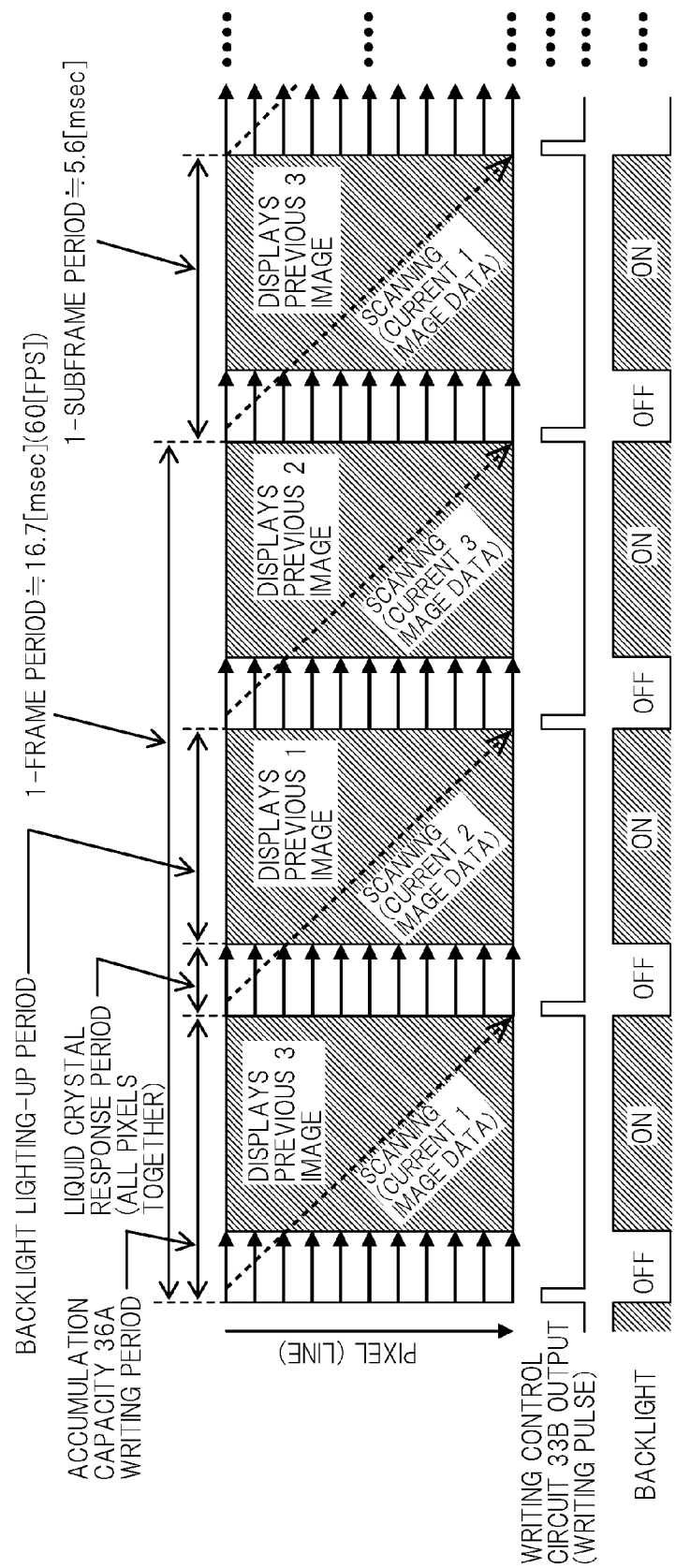
FIG. 16 is a timing chart in the time-division display apparatus in FIG. 15.

FIG. 16 shows an example of a timing chart during a one-frame period in time-division display apparatus 3 in FIG. 15.

On/off of TFT 37A is controlled by a scanning signal of scanning line driver 33. When TFT 37A is turned on, gradation voltage corresponding to the image data is accumulated in accumulation capacity 36A by signal line driver 34 first. When scanning (writing) of the whole screen ends, voltage is applied to liquid crystal pixels 35 by TFTs 37B of all the pixels being turned on together to write image data, by writing control circuit 33B, and the whole screen is refreshed with the new image data. After that, TFTs 37B of all the pixels are immediately turned off together by writing control circuit 33B, and the next image data is scanned (written) by scanning line driver 33 and signal line driver 34. During this scanning period, an image before the image of the image data being scanned is always displayed on time-division display apparatus 3. In the example in FIG. 16, the whole one-subframe period (5.6 msec) can be used as a scanning period unlike the timing chart in FIG. 14. That is, the scanning period in FIG. 16 is the same as that of the timing chart in FIG. 13.

In the example in FIG. 16, the backlight is turned on after TFTs 37B are turned on to refresh an image, and the responses of liquid crystal pixels 35 end. Therefore, the backlight lighting-up period is longer in comparison with FIG. 14, and it is found that there is an additional advantage in which the brightness is improved. If image selection by the optical shutter is not performed, the backlight may be always on.

In the example in FIG. 16, when image data are written onto pixels together by writing control circuit 33B, the voltage to be applied to liquid crystal pixel 35 is determined by capacitive coupling of accumulation capacity 36A and accumulation capacity 36B. If the voltage of a previous image remains in accumulation capacity 36B, the voltage to be applied to liquid crystal pixel 35 may be deviated from a desired voltage depending on the value of the residual voltage. In order to solve the history effect due to this residual voltage, a reset TFT for resetting the voltage applied to liquid crystal pixels 35 to a predetermined voltage (for example, voltage of the GND level) may be separately provided for each pixel. By turning on the reset TFTs to reset all the pixels all together immediately before writing image data onto the pixels all together by writing control circuit 33B, the desired voltage can be surely written at the time of writing because there is no residual voltage of the previous image. Thereby, there is obtained an advantage in which the display image quality is improved.

<Dummy-Included Multiplexing Method>

In this exemplary embodiment shown in FIG. 7, if there is horizontal/vertical blanking in scanning by time-division display apparatus 3, or if scanning is performed in a time shorter than the one-subframe period in order to perform backlight blinking driving as shown in FIG. 14, a dummy image corresponding to the blanking period may be inserted into a multiplexed image.

Figure 17:
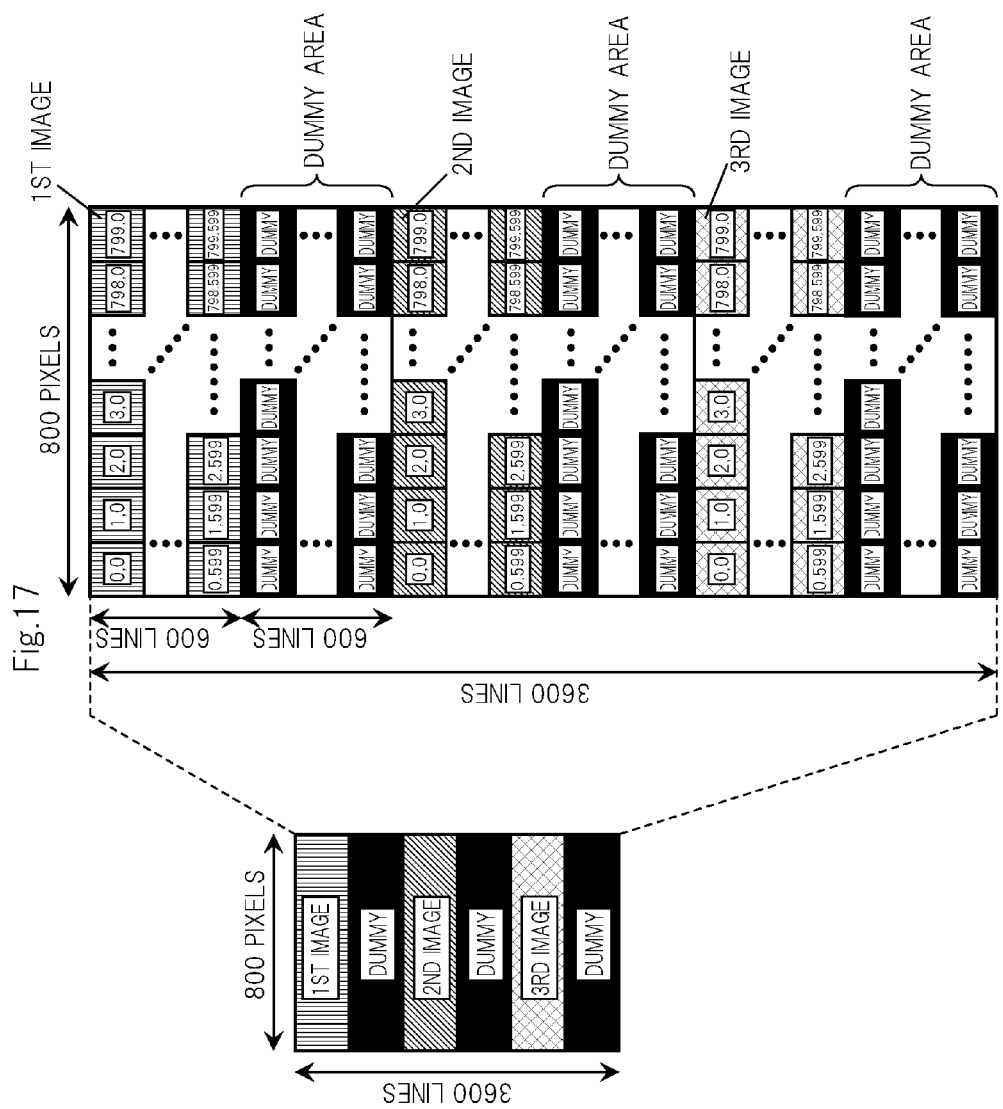
FIG. 17 is a diagram showing that dummy images are inserted in the plane-sequential multiplexing in the first exemplary embodiment.

As an example, FIG. 17 shows a method of multiplexing the first to third images at the time of performing backlight blinking driving. Here, it is assumed that the scanning period in time-division display apparatus 3 corresponds to the half of one subframe.

As shown in FIG. 17, multiplexing unit 11 plane-sequentially multiplexes the first to third images and inserts a dummy image corresponding to a non-scanning period (a liquid crystal response period, backlight lighting-up period) between the first and second images, between the second and third images, and below the third image. When the scanning period corresponds to the half of one subframe as described above, the size (the number of pixels) of this dummy image is the same size as the first to third images (800 pixels×600 lines). Therefore, a multiplexed image is an image with double the size of the multiplexed image shown in FIG. 10, that is, an image with 800 pixels×3600 lines. In the case of the single link mode standardized in the DVI, there may be a case in which such a large-sized multiplexed image cannot be transmitted due to insufficient band width. However, the image can be transmitted by using a cable, transceiver and receiver compatible with the dual link mode standardized in the DVI. In new image transmission standards such as the HDMI and the DisplayPort, a multiplexed image with a larger size can be transmitted because a transmission band larger than that of the DVI is provided.

Timing Chart

Second Example

Figure 18:
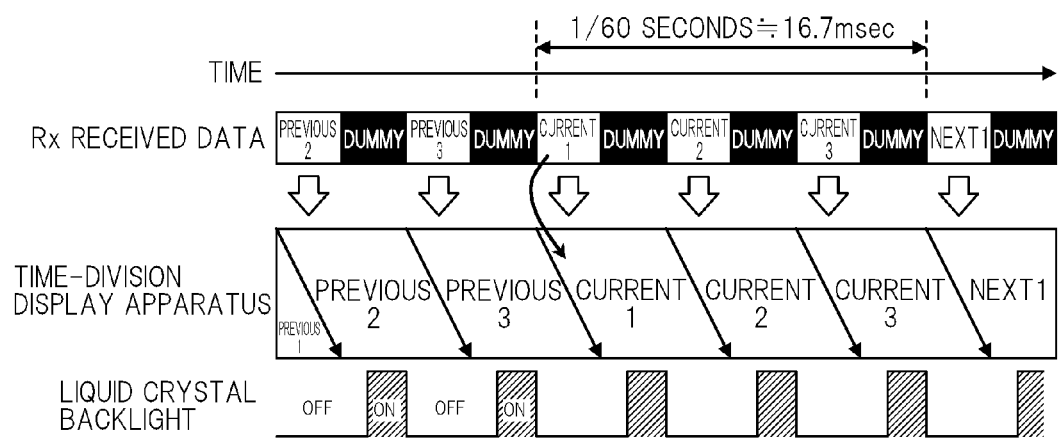
FIG. 18 is another timing chart in the first exemplary embodiment.

FIG. 18 shows a timing chart in the case of transmitting the multiplexed image in FIG. 17.

The dummy image parts are discarded from the image data received by image receiving unit 21, and only the image data of the images other than the dummy images are immediately transferred to time-division display apparatus 3. Time-division display apparatus 3 plane-sequentially displays the first image, the second image and the third image. Here, since the dummy images are inserted in the multiplexed image as shown in FIG. 17, the speed of the received image data (the image data scanned by time-division display apparatus 3) is faster than that of the example in FIG. 8 (in the example in FIG. 18, double speed).

In response to the received image data, time-division display apparatus 3 performs scanning in a period corresponding to half of one subframe (that is, performs scanning at double the speed of scanning an image corresponding to one subframe during a one-subframe period), and turns on the backlight after waiting for responses from liquid crystal elements 35. Thereby, backlight blinking driving is enabled with just the configuration in FIG. 7. In the example in FIG. 18, the rate of dummy images in the multiplexed image is 1:1. By changing this dummy image rate, the scanning speed of time-division display apparatus 3 can be changed. That is, if dummy images with half the size (the number of pixels) of each of the first to third images are inserted, time-division display apparatus 3 performs scanning in a period corresponding to two-thirds of a one-subframe period (that is, scanning at three-seconds speed), and the remaining time can be spent as liquid crystal response time and backlight lighting-up hours.

As described above, in this exemplary embodiment, by transmitting multiple images after plane-sequentially multiplexing them in accordance with the order of displaying the images on time-division display apparatus 3, a frame memory for absorbing the difference between the frame frequency at the time of displaying an image and the frame frequency at the time of transmitting an image, which is specified in an existing image transmission standard, is not required on the time-division display apparatus 3 side, and therefore, it is possible to realize time-division display at a low cost.

Second Exemplary Embodiment

Image Transmission System: Second Configuration

Figure 19:
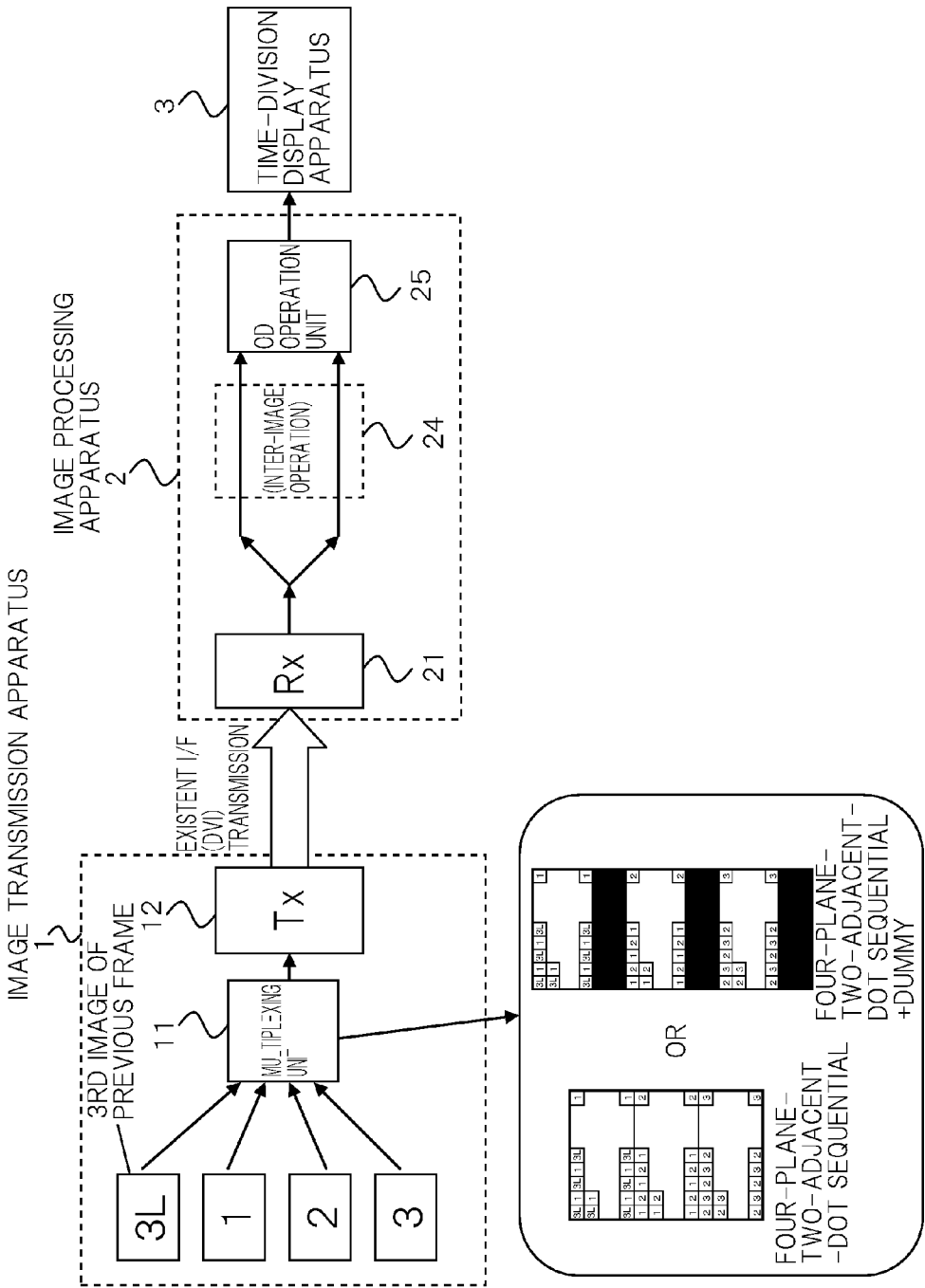
FIG. 19 is a block diagram of an image transmission system of a second exemplary embodiment.

FIG. 19 shows the configuration of an image display apparatus in this exemplary embodiment.

Unlike the first exemplary embodiment, image transmission apparatus 1 multiplexes the third image of a previous frame in addition to the first to third images, into one large image by multiplexing unit 11 and transmits the multiplexed image to image processing apparatus 2 as a DVI-format signal by image transmitting unit 12.

The multiplexing method by multiplexing unit 11 is assumed to be such that a total of three images each of which has been obtained by dot-sequentially multiplexing two temporally adjacent images (a multiplexed image of the third image of a previous frame and the first image of a current frame, a multiplexed image of the first image of the current frame and the second image of the current frame, and a multiplexed image of the second image of the current frame and the third image of the current frame) are further plane-sequentially multiplexed. This multiplexing method will be hereinafter referred to as "four-plane-two-adjacent-dot sequential".

Image processing apparatus 2 includes image receiving unit 21 and overdrive (OD) operation unit 25. Image processing apparatus 2 may comprise inter-image operation unit 24 which performs mutual operation between two temporally adjacent images from among received four-plane-two-adjacent-dot sequential images.

<Description of Overdrive>

Here, overdrive will be described.

Recently, a flat-type liquid crystal display and a liquid crystal TV prevail, replacing a CRT-system display and TV. However, in liquid crystal, the response of transmittance characteristics to change in voltage is generally slow. Therefore, there is a problem in which various kinds of image quality deterioration are caused, such as generation of movement blur in the case of displaying a moving image with active movement. In particular, when a liquid crystal display system is used for a display apparatus which performs high-speed switching display like time-division display apparatus 3 of the present invention, the frame frequency at the time of displaying an image is higher than a common display apparatus (which does not perform time division), and consequently, the image quality deterioration due to the response delay of liquid crystal is more remarkable.

Overdrive is one of techniques for improving the image quality deterioration due to the response delay of liquid crystal. By comparing one received image (assumed to be a current frame) and an image displayed on a display apparatus temporally one frame before (assumed to be a previous frame), the pixel values (gradation values) of the final image data at the time of displaying the current frame are determined.

More specifically, in overdrive, if the image value of the next frame is larger in comparison with the image value of the current frame, an image value much larger than the image value of the next frame is outputted as the final pixel value of the next frame. On the contrary, if the image value of the next frame is smaller in comparison with the image value of the current frame, an image value much smaller than the image value of the next frame is outputted as the final pixel value of the next frame. For example, if the current frame has 100 gradations, and the next frame has 150 gradations, the final pixel value of the next frame is outputted in 180 gradations. If the pixel value is outputted in 100 gradations→150 gradations just as the original image, the brightness corresponding to 150 gradations cannot be achieved for the next frame because of the response delay of liquid crystal. However, by setting 180 gradations for the next frame, the response of the crystal liquid is quickened, and brightness corresponding to 150 gradations can be obtained.

It is an advantage of overdrive that, not by increasing the response speed of the liquid crystal itself but by adaptively changing the gradations to be displayed according to the gradation difference between frames as described above, the response delay of liquid crystal can be compensated for, and the desired brightness can be substantially obtained.

Figures 20, 21, 22:
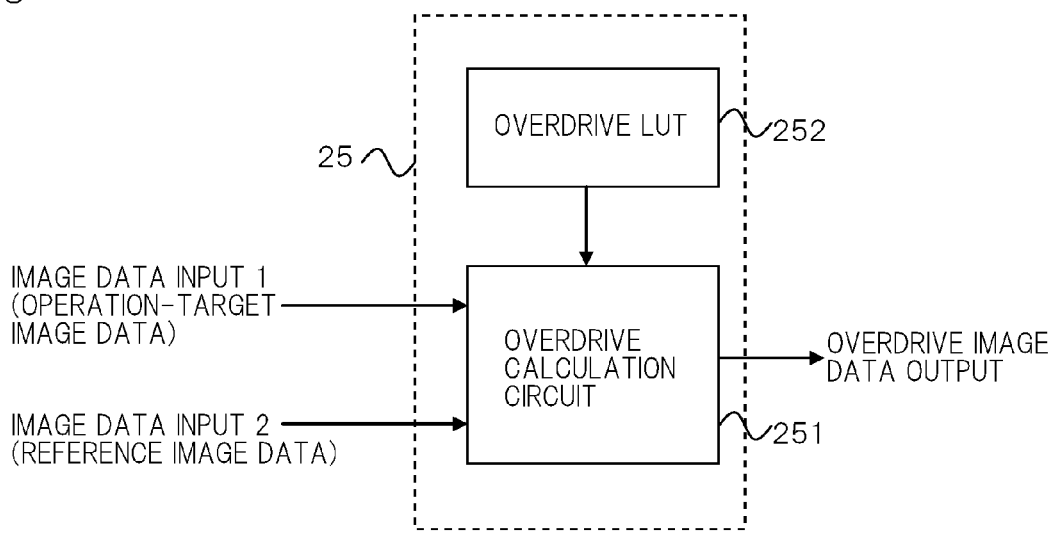
FIG. 20 is a block diagram of an example of an overdrive (OD) operation unit in FIG. 19.
FIG. 21 is a diagram showing an example of an overdrive LUT in FIG. 20.
FIG. 22 is a diagram showing another example of the overdrive LUT in FIG. 20.

An overdrive method by OD operation unit 25 of the present invention will be described. FIG. 20 shows a configuration example of OD operation unit 25.

OD operation unit 25 includes overdrive calculation circuit 251 and overdrive LUT (Look Up Table) 252.

To OD operation unit 25, there are inputted the operation-target image data of an operation-target image (for example, a current 1 image), and the reference image data of a reference image (for example, a previous 3 image) which is displayed temporally one subframe before in time-division display apparatus 3.

On the basis of the pixel values (image data) of the inputted operation-target image and the pixel values (image data) of the reference image, overdrive calculation circuit 251 refers to overdrive LUT 252, determines the pixel values of image data after overdrive calculation, and outputs them as overdrive image data. Overdrive LUT 252 is stored in an external ROM or RAM or the like. FIG. 21 shows an example of overdrive LUT 252 in the case where image data is 8-bit data.

In overdrive LUT 252, the pixel values after completion of the overdrive calculation on the basis of the operation-target image data and the reference image data are arranged in a matrix. For example, if the operation-target image data is 1 and the reference image data is 3, then 10 is outputted as overdrive image data.

Data to be stored in overdrive LUT 252 is such a value (pixel value) that, no matter what value the reference image data indicates for operation-target image data of one certain gradation (for example, 0 gradation), the brightness is constant when the operation-target image is displayed on time-division display apparatus 3.

By using such overdrive LUT 252, it is possible to show a display with the same brightness no matter what image the temporally previous subframe shows, and therefore, it is possible to compensate for the response delay of liquid crystal and perform a high-image-quality time division display.

Overdrive LUT 252 does not have to be the 256×256 matrix as shown in FIG. 21. For example, the 8×8 matrix divided for every 32 gradations is also possible as shown in FIG. 22. In this case, overdrive calculation circuit 251 calculates the desired overdrive image data by linear interpolation (interpolation operation) to adjacent pixel values. For example, if the operation-target image data indicates 103, and the reference image data indicates 208 gradations, the overdrive image data can be calculated by performing linear interpolation from the four values indicated by the round quadrilateral in FIG. 22 (71, 107, 55 and 91 indicated by (operation-target image data, reference image data)=(96,192), (128,192), (96,224) and (128,224)). In the case of FIG. 22, by performing such calculation, the memory size of overdrive LUT 252 can be reduced in comparison with the case of FIG. 21.

<Multiplexing Method: Four-Plane-Two-Adjacent-Dot Sequential>

The four-plane-two-adjacent-dot sequential multiplexing method by multiplexing unit 11 will be described.

Figure 23:
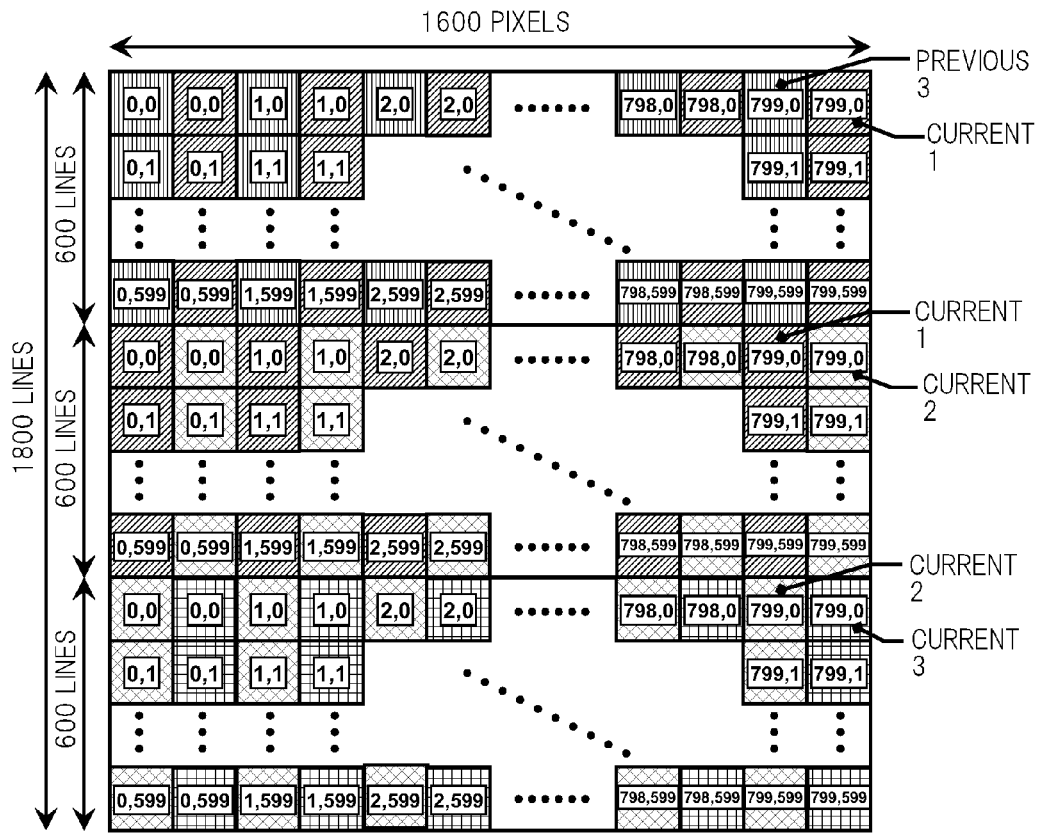
FIG. 23 is a diagram showing a four-plane-two-adjacent-dot sequential multiplexing method in the second exemplary embodiment.

Multiplexing unit 11 multiplexes the first to third images as shown in FIG. 23 (multiplexed image: 1600 pixels×1800 lines). That is, multiplexing unit 11 plane-sequentially multiplexes a total of three sub-images in which temporally adjacent two images with the display order of time-division display apparatus 3 from among the third image of a previous frame (previous 3) and the first to third images of a current image (current 1 to current 3) are dot-sequentially arranged.

That is, a first sub-image in which the pixels of previous 3 and current 1 at the same positions are dot-sequentially arranged;

a second sub-image in which the pixels of current 1 and current 2 at the same positions are dot-sequentially arranged; and a third sub-image in which the pixels of current 2 and current 3 at the same positions are dot-sequentially arranged are plane-sequentially multiplexed.

In FIG. 23, for example, at each pixel in the first sub-image, previous 3 and current 1 are multiplexed in that order. As for the four-plane-two-adjacent-dot sequential multiplexing, however, it is not necessarily required to perform multiplexing in accordance with the display order in time-division display apparatus 3, unlike the plane-sequential multiplexing. The important point in the four-plane-two-adjacent-dot sequential multiplexing is that pixel data at the same position of two temporally adjacent images are transmitted almost at the same time. Therefore, the transmission order within a sub-image is not necessarily required to be strictly dot-sequential, and it is sufficient if pixel data of previous 3 and current 1, current 1 and current 2, and current 2 and current 3 at the same position in the sub-images are transmitted within a relatively short time. However, it should be noted that, if the pixel data are transmitted at significantly different hours, a buffer memory for adjusting the order is additionally required on the receiving side.

However, it is necessary that plane-sequential multiplexing of the first sub-image, the second sub-image and the third sub-image should be in accordance with the display order of time-division display apparatus 3. The reason is: at OD operation unit 25, the overdrive image of current 1 by the first sub-image, the overdrive image of current 2 by the second sub-image, and the overdrive image of current 3 by the third sub-image are temporally sequentially outputted, and the order corresponds to the display order of time-division display apparatus 3. Therefore, if the order of plane-sequential multiplexing of the sub-images is changed, the display order on time-division display apparatus 3 will be an undesirable order.

Similarly to the case of the plane-sequential multiplexing, the size of a multiplexed image can be changed within a range in which the transmission order is not changed.

Timing Chart

First Example

Figure 24:
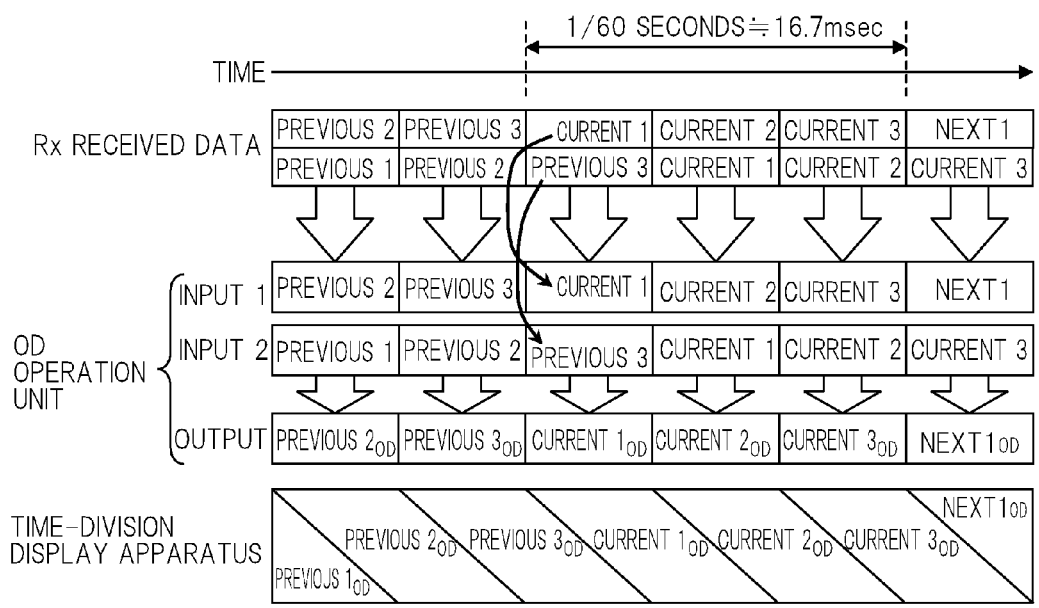
FIG. 24 is a timing chart in the second exemplary embodiment.

FIG. 24 shows a timing chart in this exemplary embodiment.

Image data received by image receiving unit 21 is divided into two images by a controller or the like not shown. At this time, since two temporally adjacent images are dot-sequentially multiplexed in each sub-image, the data of the same pixels of the temporally adjacent two images are received almost at the same time. However, strictly, these pixel data are not received quite at the same time, and therefore memory for causing a delay corresponding to one pixel is required even in the case of dot-sequential multiplexing. Since this delay circuit can be configured by a D flip-flop corresponding to one pixel and is small enough to be ignored in comparison with large-scale memory such as a frame memory, it can be said that memory is essentially not required. This memory is therefore omitted in this exemplary embodiment. The operation of OD operation unit 25 is as described before.

That is, in the first sub-image, an overdrive image of current 1 (current 1OD) is outputted with current 1 as an operation-target image and previous 3 as a reference image;

in the second sub-image, an overdrive image of current 2 (current 2OD) is outputted with current 2 as an operation-target image and current 1 as a reference image; and in the third sub-image, an overdrive image of current 3 (current 3OD) is outputted with current 3 as an operation-target image and current 2 as a reference image.

Current 1OD, current 2OD and current 3OD are sequentially transferred to time-division display apparatus 3 immediately, and time-division display apparatus 3 plane-sequentially displays the first image, the second image and the third image.

<Multiplexing Method: Four-Plane-Two-Adjacent-Dot Sequential Including Dummy>

Figure 25:
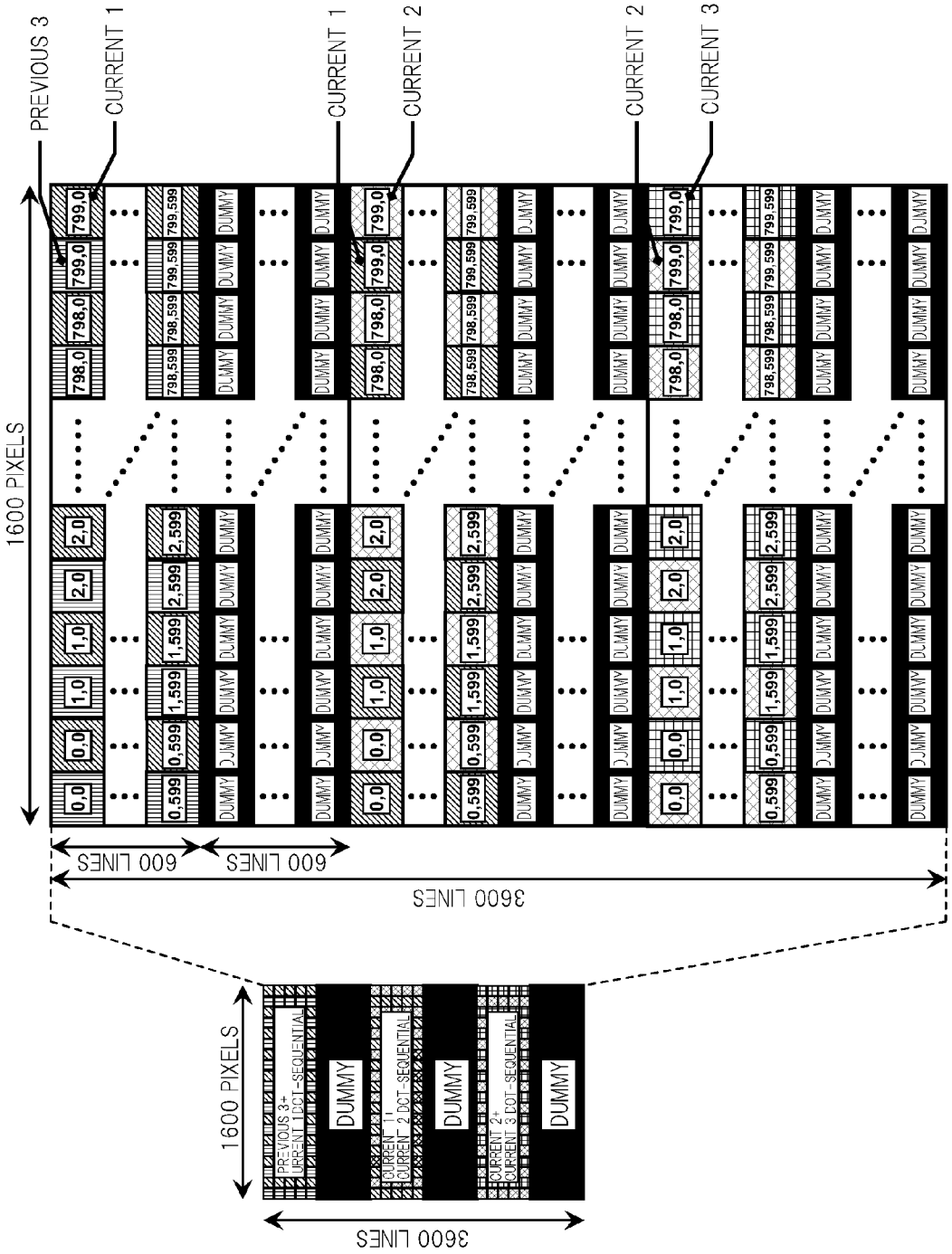
FIG. 25 is a diagram showing another four-plane-two-adjacent-dot sequential multiplexing method in the second exemplary embodiment.

As described in the first exemplary embodiment, dummy images may be inserted in the multiplexed image in FIG. 23 in order to perform backlight blinking driving in time-division display apparatus 3. FIG. 25 shows a four-plane-two-adjacent-dot sequential multiplexing method in the case where dummy images are inserted. Here, it is assumed that the scanning period in time-division display apparatus 3 corresponds to the half of one subframe.

As shown in FIG. 25, multiplexing unit 11 inserts dummy images corresponding to a non-scanning period (a liquid crystal response period, a backlight lighting-up period) between the first sub-image and the second sub-image, between the second sub-image and the third sub-image, and below the third sub-image). The size of the dummy images is the same as each sub-image (1600 pixels×600 lines) if the scanning period corresponds to the half of one subframe as described above. Therefore, a multiplexed image is an image with double the size of the multiplexed image shown in FIG. 23, that is, an image with 1600 pixels×3600 lines.

Timing Chart

Second Example

Figure 26:
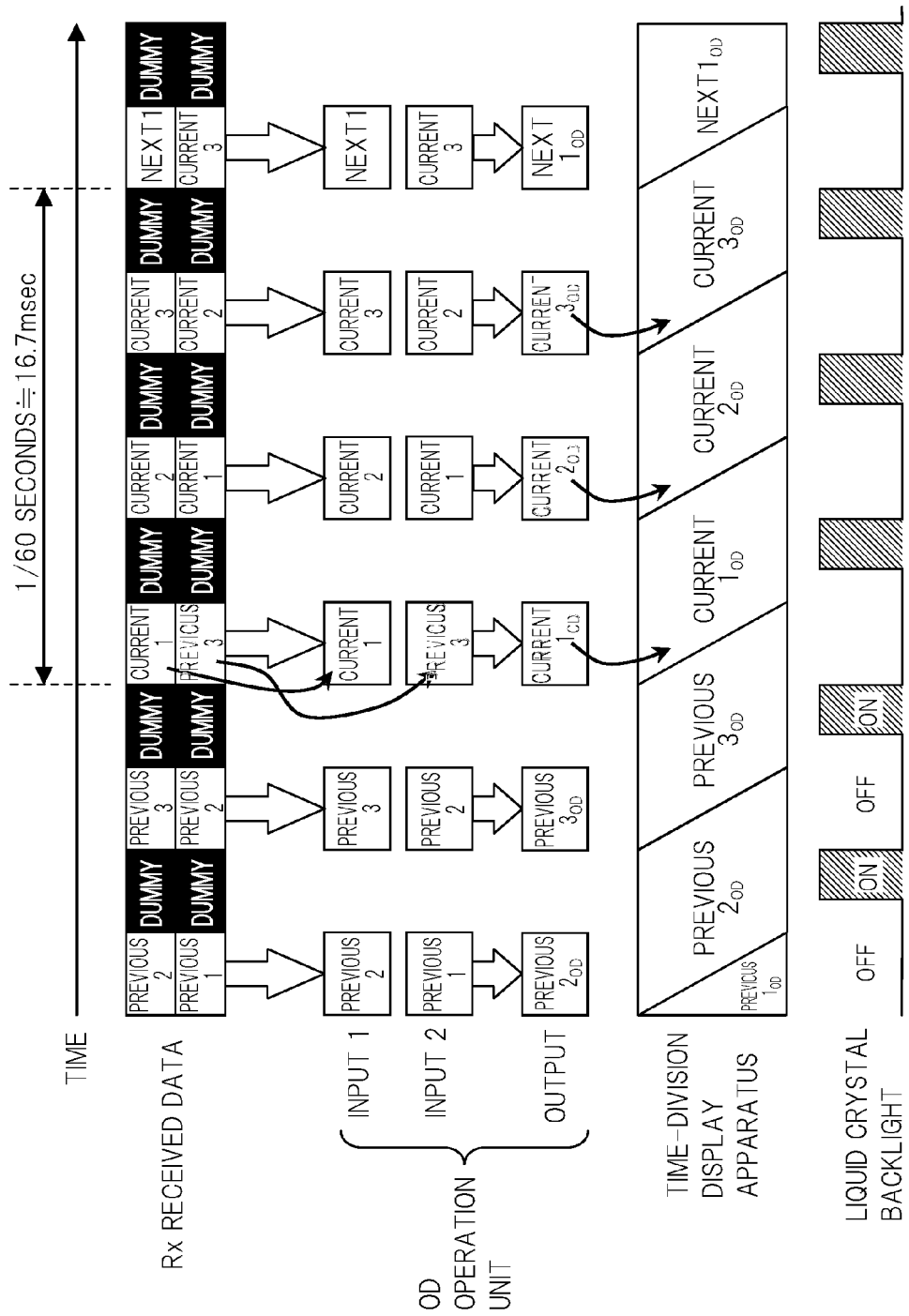
FIG. 26 is another timing chart in the second exemplary embodiment.

FIG. 26 shows a timing chart in the case of transmitting the multiplexed image in FIG. 25.

As for image data received by image receiving unit 21, dummy image parts are discarded, and only the image data of images other than the dummy images are inputted to OD operation unit 25.

Current 1OD, current 2OD and current 3OD operated by OD operation unit 25 are immediately transferred to time-division display apparatus 3, and time-division display apparatus 3 plane-sequentially displays the first image, the second image and the third image. Here, since the dummy images are inserted in the multiplexed image as shown in FIG. 25, the speed of the image data received (scanned by time-division display apparatus 3) is faster than that of the example in FIG. 24 (in the example in FIG. 25, double speed).

In response to the received image data, time-division display apparatus 3 performs scanning in a period corresponding to the half of one subframe, and turns on the backlight after waiting for responses from liquid crystal pixels 35. Thereby, backlight blinking driving is enabled with the same configuration in FIG. 19. The rate of dummy images in the multiplexed image is 1:1 in the example in FIG. 26. By changing this dummy image rate, the scanning speed of time-division display apparatus 3 can be changed. That is, if dummy images with half the size of a sub-image are inserted, time-division display apparatus 3 performs scanning in a period corresponding to two-thirds of a one-subframe period, and the remaining time can be spent as liquid crystal response time and backlight lighting-up hours.

As described above, in this exemplary embodiment, since the response delay of liquid crystal can be compensated for by performing overdrive driving, more accurate and higher-image-quality gradation display is possible in comparison with the first exemplary embodiment. Especially in the case of displaying a moving image, it is possible to display a clear moving image with little blur.

Exemplary Embodiment

An exemplary embodiment in the present invention will be described.

As for the kind of transmission-target image in the present invention, images of multiple systems or high-speed moving images are possible.

The images of multiple systems may be images related to one another, such as those for a three-dimensional image, or images unrelated to one another, such as those for multiple TV channels.

<Transmission of Four Images of Four Systems which are Unrelated to one Another>

Figure 27:
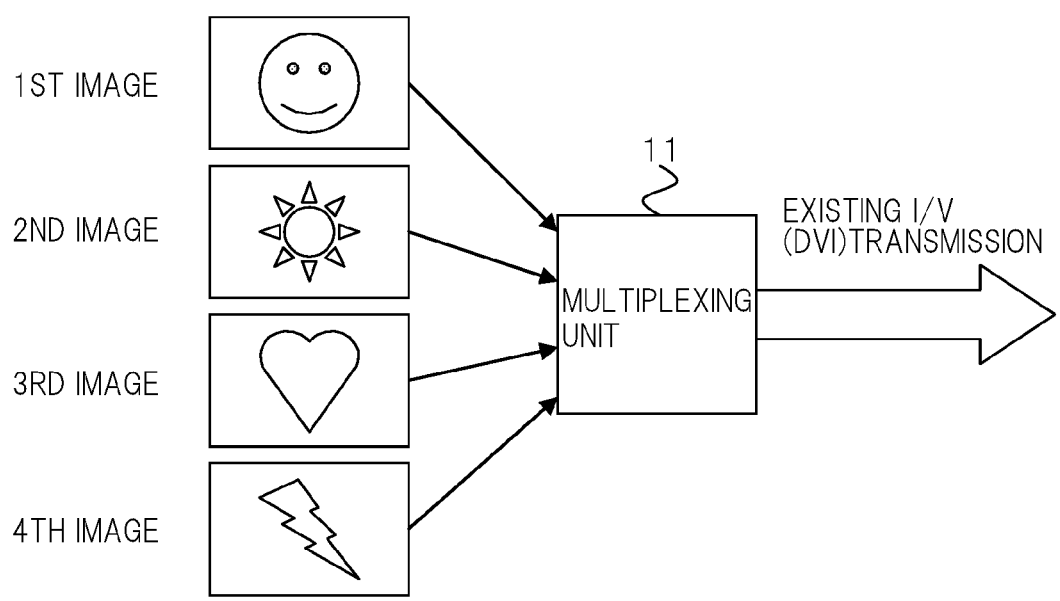
FIG. 27 is a diagram showing images of four systems, which are examples of the multiple images transmitted according to the present invention.

Examples of the images unrelated to one another include the images of three systems as shown in FIG. 4 and the images of four systems shown in FIG. 27.

Figure 28:
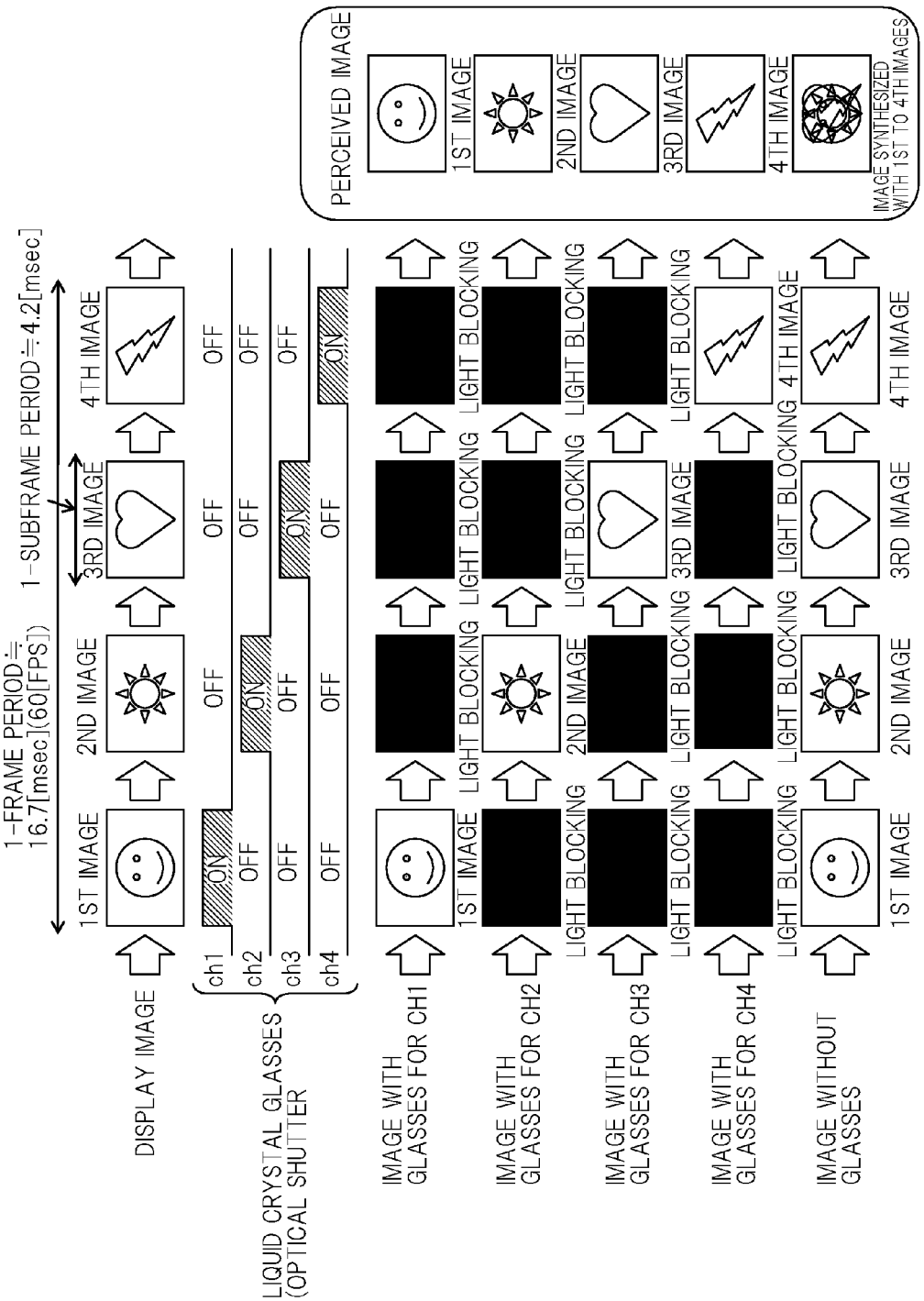
FIG. 28 is a timing chart in the case of displaying the images of four systems in FIG. 27 on a time-division display apparatus.

FIG. 28 is a timing chart of the timing of displaying the first to fourth images on time-division display apparatus 3 and the transmission/blocking timing of an optical shutter such as liquid crystal glasses.

Time-division display apparatus 3 displays the first to fourth images in one frame by switching them at a high speed in the order of the first image→second image→third image→fourth image. That is, since the first to fourth images are displayed during a one-frame period (16.7 msec), a one-subframe period is ⅟60/4≈4.2 msec. Four kinds of optical shutters having different transmission periods are used to separately view the first to fourth images.

That is, an optical shutter for ch1 gets into a light transmission state in synchronization with the frame of the first image that is being displayed and is in a light blocking state during other periods.

An optical shutter for ch2 gets into a light transmission state in synchronization of the frame of the second image that is being displayed and is in a light blocking state during other periods.

An optical shutter for ch3 gets into a light transmission state in synchronization of the frame of the third image that is being displayed and is in a light blocking state during other periods.

An optical shutter for ch4 gets into a light transmission state in synchronization of the frame of the fourth image that is being displayed and is in a light blocking state during other periods.

Alternatively, it is also possible for the optical shutter side or the time-division display apparatus 3 side to switch the channel to be viewed. An image constituted by the first to fourth moving images overlapped with one another is viewed without the optical shutters. Due to this, multiple persons can share one display and view different images.

Figure 29:
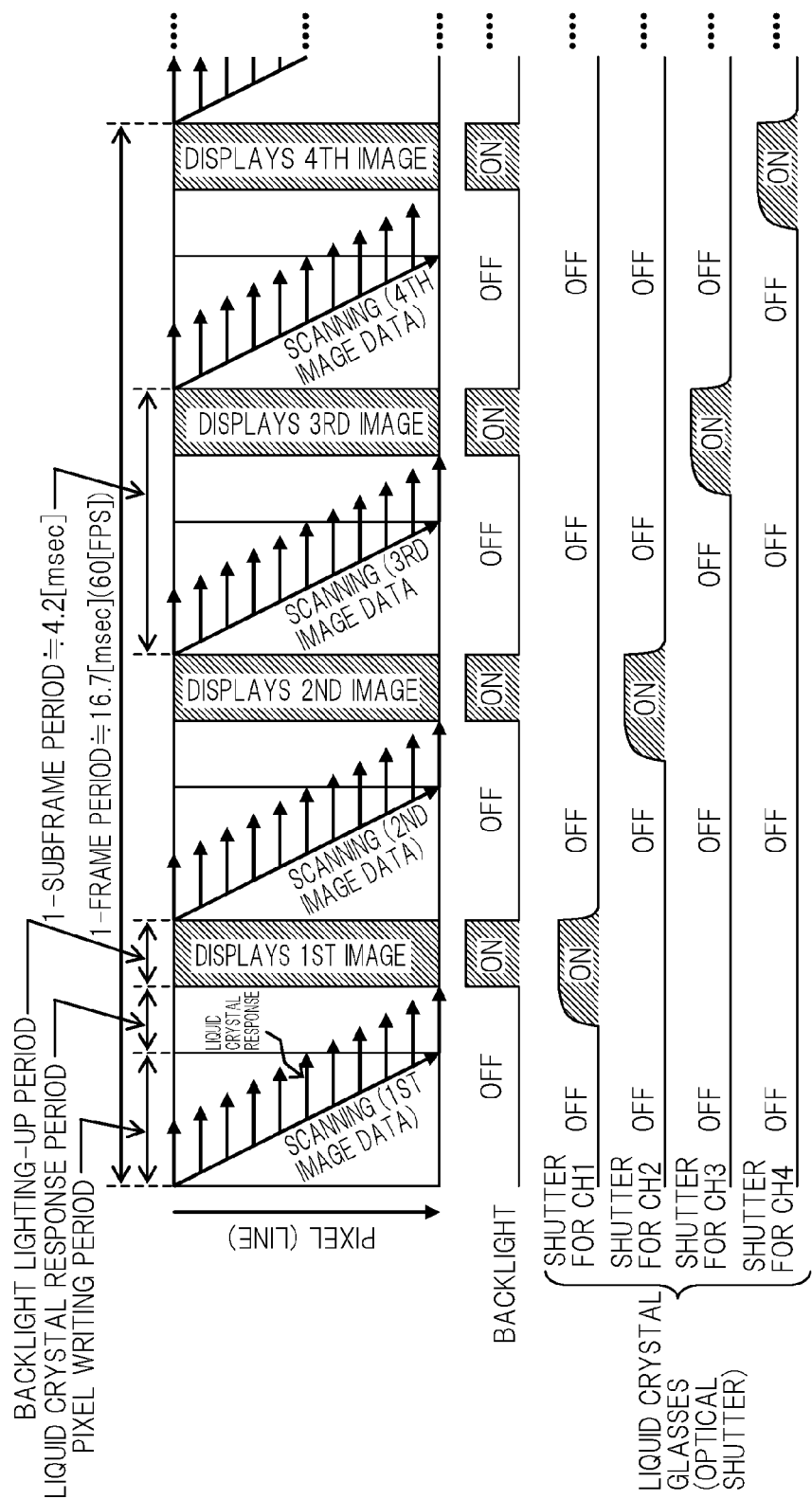
FIG. 29 is a timing chart in the case of displaying the images of four systems in FIG. 27 on a time-division display apparatus using a liquid crystal panel.

FIG. 29 is a timing chart in the case where time-division display apparatus 3 is configured with the use of the liquid crystal panel shown in FIG. 12.

In this case, backlight blinking driving is performed to separate the first to fourth images by the optical shutters. As shown in FIG. 29, scanning is performed in a period corresponding to the half of a one-subframe period, and the backlight is turned on after waiting for responses from liquid crystal pixels 35. The optical shutters for ch1 to ch4 are controlled to be turned on in synchronization with the timing of the first to fourth images that are being displayed, respectively.

An exemplary embodiment in the case of transmitting the first to fourth images according to the present invention will be described.

As shown in FIG. 27, the first to fourth images are plane-sequentially or five-plane-two-adjacent-dot sequentially multiplexed by multiplexing unit 11 and are transmitted to image processing apparatus 2 via an existing image transmission path (such as a DVI path).

In the first exemplary embodiment, image data received by image receiving unit 21 of image processing apparatus 2 is immediately transmitted to time-division display apparatus 3.

In comparison, in the second exemplary embodiment, overdrive is operated for image data received by image receiving unit 21 of image processing apparatus 2 by the means of OD operation unit 25 with a subframe displayed on time-division display apparatus 3 temporally one subframe before as a reference image. That is, the second image is overdriven from the first image; the third image is overdriven from the second image; the fourth image is overdriven from the third image; and the first image is overdriven from the fourth image of the previous frame. By performing overdrive, high-image-quality display without cross talk is realized even in the case of temporally separating images by an optical shutter as in FIG. 27, in comparison with the first exemplary embodiment.

<Transmission of Right-Eye Image and Left-Eye Image Related to Each Other>

Figure 30:
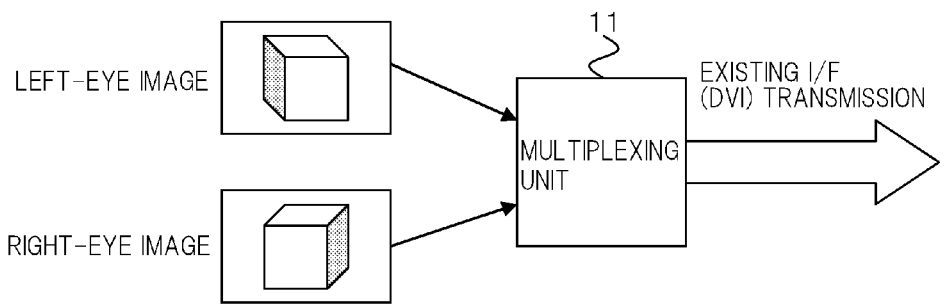
FIG. 30 is a diagram showing a three-dimensional image constituted by a right-eye image and a left-eye image which are examples of the multiple images transmitted according to the present invention.

As an example of the images related to one another, a three-dimensional image constituted by a right-eye image and a left-eye image as shown in FIG. 30 can be given.

Figure 31:
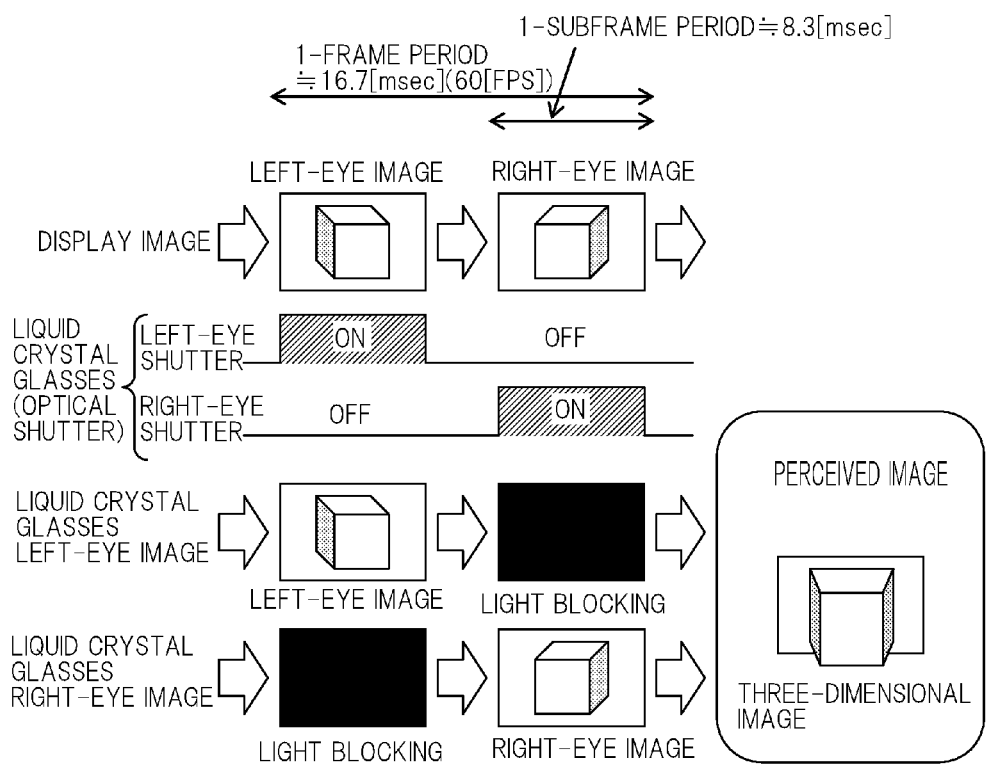
FIG. 31 is a timing chart in the case of displaying the right-eye image and the left-eye image in FIG. 30 on a time-division display apparatus.

FIG. 31 is a timing chart of the timing of displaying a left-eye image and a right-eye image and the light transmission/blocking timing of an optical shutter such as liquid crystal glasses in time-division display apparatus 3.

It is assumed that time-division display apparatus 3 displays a left-eye image and a right-eye image in that order in one frame, and it displays the left-eye image and the right-eye image by switching them at a high speed. That is, since the left-eye image and the right-eye image are displayed during a one-frame period (16.7 msec), a one-subframe period is ⅟60/2=8.3 msec.

As for the optical shutter, the right-eye shutter gets into a light transmission state and the left-eye shutter gets into a light blocking state, in synchronization with a right-eye image being displayed, and the left-eye shutter gets into a light transmission state and the right-eye shutter gets into a light blocking state, in synchronization with a left-eye image being displayed.

Thereby, different images temporally enter the right and left eyes to realize three-dimensional display. In this exemplary embodiment also, an optical shutter is used. Therefore, if time-division display apparatus 3 is configured with the use of a liquid crystal panel, it is desirable to perform backlight blinking driving for reduction of cross talk when the optical shutter is mounted.

An exemplary embodiment of transmitting the left-eye image and right-eye image according to the present invention will be described.

As shown in FIG. 30, the left-eye image and the right-eye image are plane-sequentially or three-plane-two-adjacent-dot sequentially multiplexed by multiplexing unit 11 and transmitted to image processing apparatus 2 via an existing image transmission path (such as a DVI path).

In the second exemplary embodiment, overdrive is operated for image data received by image receiving unit 21 of image processing apparatus 2 by means of OD operation unit 25 with a subframe displayed on time-division display apparatus 3 temporally one subframe before as a reference image. That is, the right-eye image is overdriven from the left-eye image, and the left-eye image is overdriven from the right-eye image of the previous frame.

According to the above, favorable time-division three-dimensional display is realized which is low-cost because of unnecessity of a memory on the time-division display apparatus 3 side. Alternatively, a high-image-quality time-division three-dimensional display is realized by overdrive.

<Transmission of Secret Image, Reverse Image and Public Image Related to One Another>

As another example of the images related to one another, there are a secret image which can be viewed only by a person who wears an optical shutter, a reverse image to negate the secret image to make it appear to be an image quite unrelated to the secret image, and a public image to be viewed by a person who does not wear the optical shutter.

Figure 33:
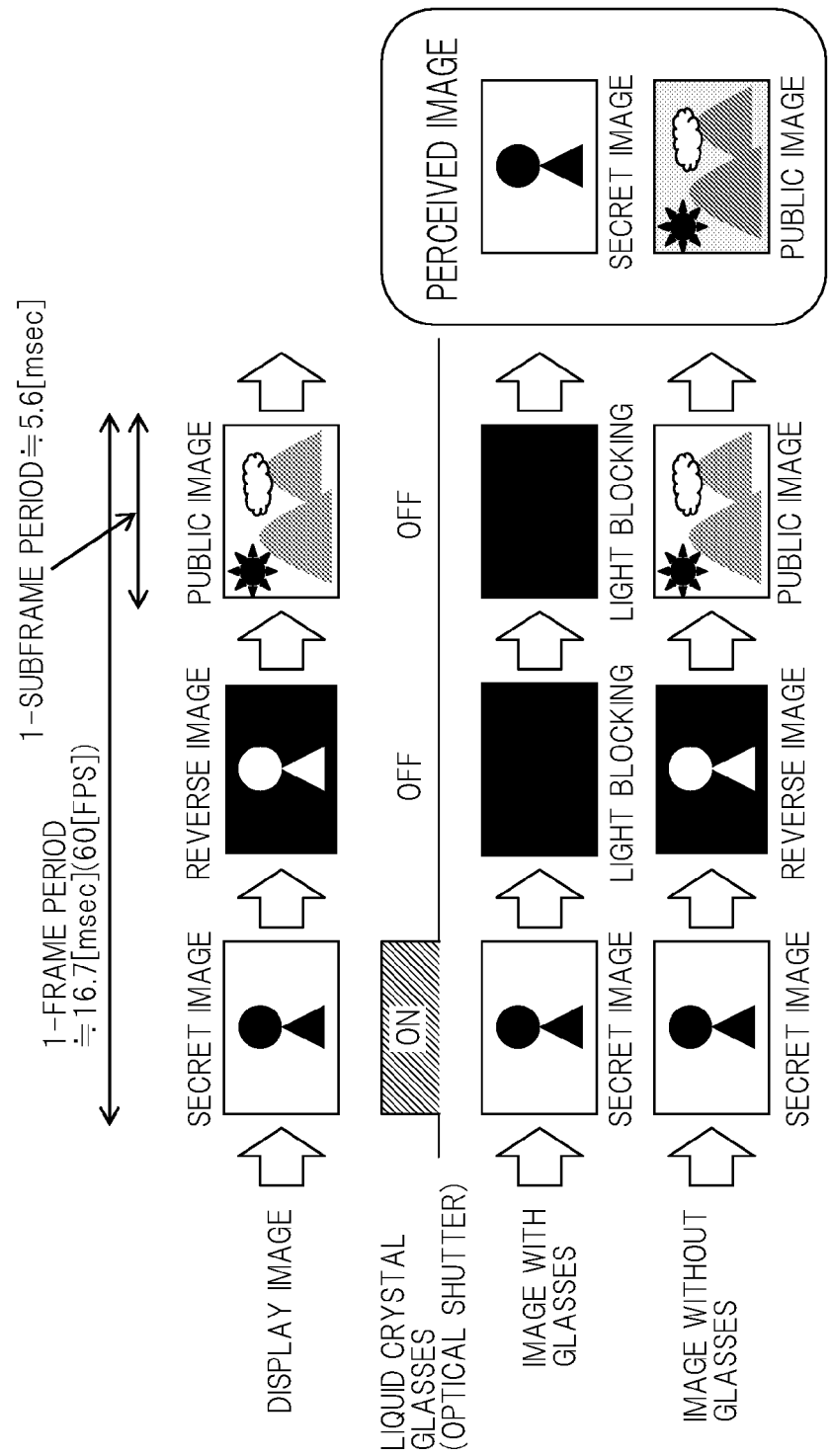
FIG. 33 is a timing chart in the case of displaying the secret image, the reverse image and the public image in FIG. 32 on a time-division display apparatus.

As shown in FIG. 33, the secret image, the reverse image and the public image are switched at a high speed and displayed in the order of secret image→reverse image→public image in time-division display apparatus 3, and the optical shutter is controlled to transmit light in synchronization with the secret image that is being displayed and to block light during other periods. Thereby, only a person who wears the optical shutter can view the secret image. In comparison, a person who does not wear the optical shutter perceives only the public image because the secret image and the reverse image are temporally offset against each other and make an all-gray image due to the temporal integration effect of eyesight. In this exemplary embodiment also, an optical shutter is used. Therefore, if time-division display apparatus 3 is configured with the use of a liquid crystal panel, it is desirable to perform backlight blinking driving for reduction of cross talk when the optical shutter is mounted.

An exemplary embodiment in the case of transmitting the secret image, the reverse image and the public image according to the present invention will be described.

Figure 32:
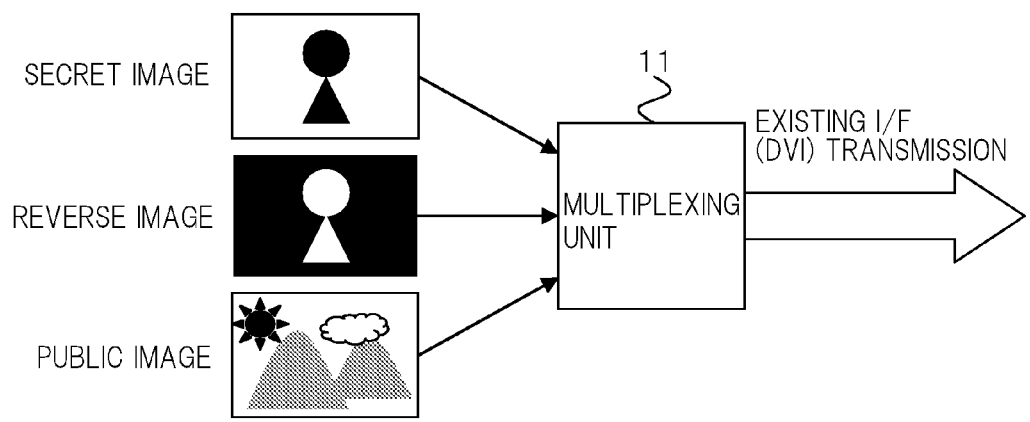
FIG. 32 is a diagram showing a secret image, a reverse image and a public image, which are examples of the multiple images transmitted according to the present invention.

As shown in FIG. 32, the secret image, the reverse image and the public image are plane-sequentially or four-plane-two-adjacent-dot sequentially multiplexed by multiplexing unit 11 and transmitted to image processing apparatus 2 via an existing image transmission path (such as a DVI path).

In the second exemplary embodiment, overdrive is operated for image data received by image receiving unit 21 of image processing apparatus 2 by means of OD operation unit 25 with a subframe displayed on time-division display apparatus 3 temporally one subframe before as a reference image. That is, the reverse image is overdriven from the secret image, the public image is overdriven from the reverse image, and the secret image is overdriven from the public image of the previous frame.

In the second exemplary embodiment, it is possible to perform various inter-image operations by using inter-image operation unit 24 of image processing apparatus 2, in addition to overdrive. In this exemplary embodiment, for example, it is possible to enhance the contrast of the public image by decreasing the brightness of the secret image and the reverse image to one half and by mixing the public image with the reverse image. It is also possible to make it difficult to view the secret image by performing a predetermined operation on the public image according to the brightness value of the reverse image correlated with the secret image.

According to the above, in the secret, reverse and public images also, favorable time-division display is realized which is low-cost because of unnecessity of a memory on the time-division display apparatus 3 side. Especially, in this exemplary embodiment, it is desirable to accurately display gradations in order to prevent the secret image from being recognized by a person who does not use the optical shutter. Furthermore, according to the second exemplary embodiment, it is possible to compensate for the response delay of liquid crystal pixels 35 and to accurately display desired gradations by performing overdrive operation with a subframe displayed temporally one subframe before as a reference image in time-division display apparatus 3. From this, there is also obtained an advantage in which the secrecy of a secret image can be improved, in this exemplary embodiment.

In the exemplary embodiments described above, a transmission-target image itself may be a still image or may be a moving image. In the case of a still image, the same sixty images (without movement) are transmitted per second. In the case of a moving image, images with different patterns (with movement) are transmitted. Since the transmission speed is 60 FPS, the original image of the moving image is not required to be of 60 FPS, and 30 FPS or 15 FPS is also possible. If the transmission speed is 30 FPS or 15 FPS, the same image is transmitted by the adjacent two or four frames. In images of multiple systems, moving images and still images may be mixed.

<Transmission of High-Speed Moving Images of One System>

Figure 34:
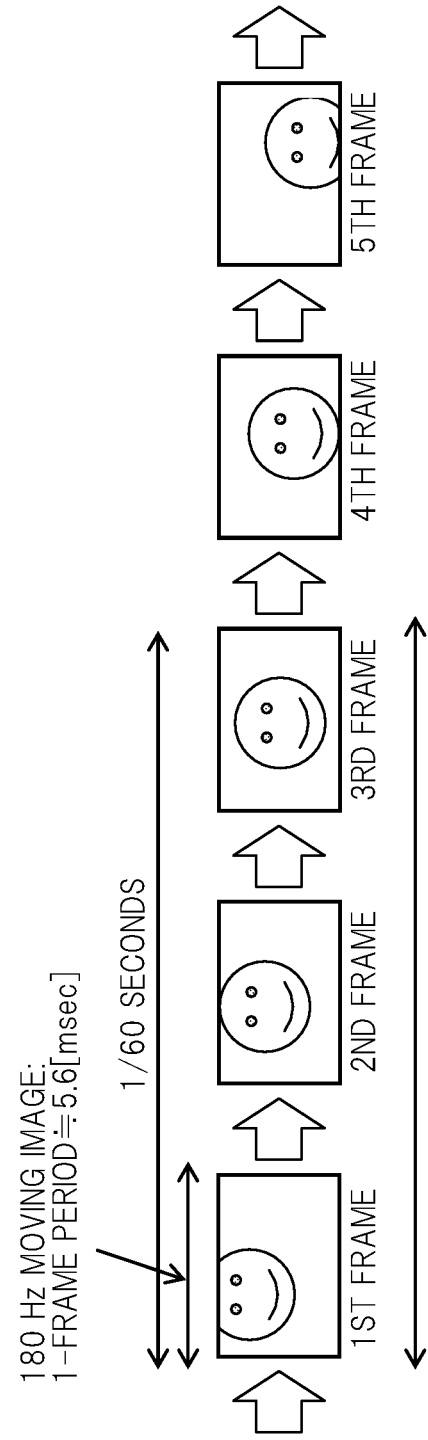
FIG. 34 is a diagram showing a high-speed moving image of one system, which is an example of the multiple images transmitted according to the present invention.

Furthermore, in the present invention, a transmission target image may be a high-speed moving image of one system as shown in FIG. 34. In an existing image transmission path such as a DVI path, the frame frequency capable of transmitting an image is 60 Hz. However, it is possible to transmit such a moving image in which the frame frequency exceeds 60 Hz (180 Hz or the like) as in FIG. 34 via an existing image transmission path, and it is also possible to display a high-speed moving image at a low cost because a memory is not required on the time-division display apparatus 3 side.

An exemplary embodiment in the case of transmitting a high-speed moving image of one system according to the present invention will be described.

Figure 35:
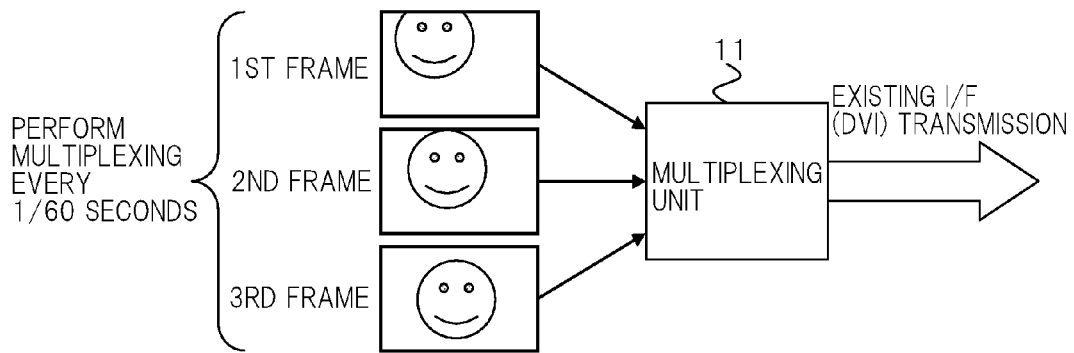
FIG. 35 is a diagram showing an example in the case of transmitting the high-speed moving image in FIG. 34.
Figure 36:
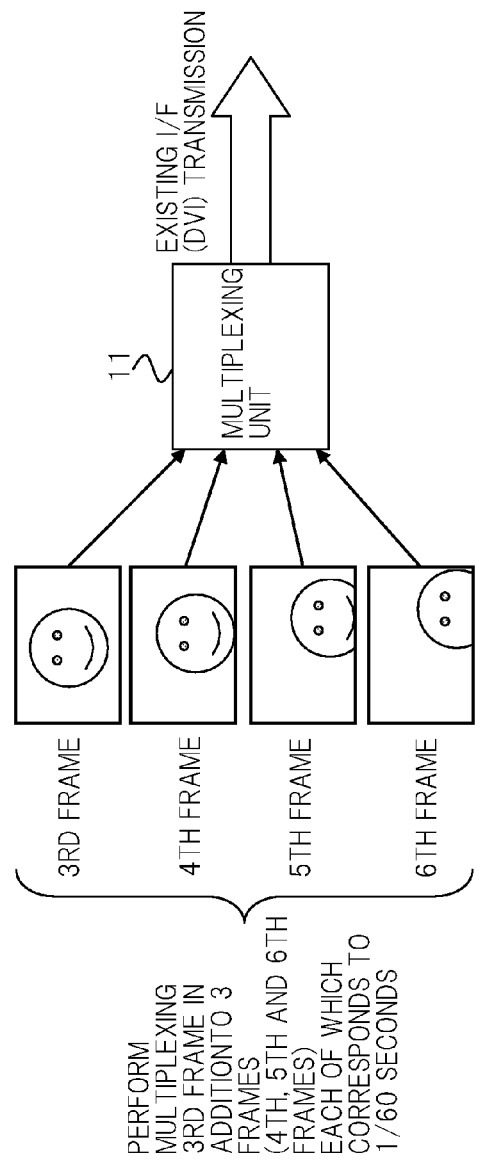
FIG. 36 is a diagram showing another example in the case of transmitting the high-speed moving image in FIG. 34.

Since the frame frequency of a high-speed moving image exceeds 60 Hz (in this example, 180 Hz) as shown in FIG. 34, the high-speed moving image cannot be transmitted via an existing image transmission path such as a DVI path. However, by applying the approach to multiplexing of the present invention and performing multiplexing into one image and transmitting it per ¹⁄₆₀ seconds, the high-speed moving image can be transmitted even if the transmission path is of 60 Hz. That is, it is found that, in the case of a high-speed moving image with 180 Hz, three temporally adjacent frames can be multiplexed and transmitted, as shown in FIG. 35. At this time, it is important to perform multiplexing in consideration of the order of displaying the frames on a time-division display apparatus, according to the present invention. That is, in FIG. 36, if plane-sequential multiplexing is performed according to the first exemplary embodiment, the multiplexed image is an image obtained by plane-sequential multiplexing the first frame, the second frame and the third frame in that order from the top because the order of being displayed on a time-division display apparatus is the first frame→second frame→third frame→ . . . . In the case of using the configuration of the second exemplary embodiment, when the fourth to sixth frames are multiplexed, the third frame which is temporally one frame before the fourth frame is multiplexed together. Thereby, an overdrive operation can be performed in image processing apparatus 2. By doing this, it is possible to realize a high-speed moving image display with a high image quality and without blur due to overdrive.

As described above, favorable high-speed moving image display becomes possible which does not require a memory on the image receiving side. Alternatively, it is possible to realize clear high-speed moving image display without blur due to overdrive.

In the exemplary embodiments described above, the DVI has been described. However, it goes without saying that, in the case of using an image transmission path compatible with the frame frequency up to 120 Hz in the standard, such as an HDMI path and a DisplayPort path, the approach of the present invention is also applicable. A 120 Hz interface makes it possible to transmit a moving image with 240 Hz, a moving image with 360 Hz or more, and the like.

The present invention has been described on the basis of the above exemplary embodiments. The present invention is not limited to the above exemplary embodiments, and it, of course, includes various variations and modifications which can be made by one skilled in the art within the scope of the invention of each claim in the claims.

This application claims (the benefit of) priority based on Japanese Patent Application No. 2008-309638 filed on Dec. 4, 2008, the disclosure of which is hereby incorporated by reference thereto in its entirety.

The invention claimed is:

1. An image transmission system comprising:
   a time-division display apparatus that sequentially displays first to N-th (N: an integer of 2 or more) images with a frequency above M×N [Hz] (M: an integer of 1 or more) by time division;
   a multiplexing unit that plane-sequentially multiplexes the first to N-th images in accordance with order of displaying the first to N-th images on the time-division display apparatus;
   a transmitting unit that sends out the multiplexed images which have been multiplexed by the multiplexing unit to a predetermined image transmission path with a frame frequency of M [Hz]; and
   a receiving unit that receives the multiplexed images from the transmitting unit via the predetermined image transmission path and sequentially transmits image data of the multiplexed images to the time-division display apparatus, wherein:
   each of the first to N-th images is a subframe included in one frame;
   the time-division display apparatus scans and displays each of the first to N-th images with a speed K times (K: a real number satisfying 1<K) as fast as the speed of displaying and scanning an image corresponding to one subframe during a one-subframe period; and
   the multiplexing unit:
   plane-sequentially multiplexes dummy images with the number of pixels K−1 times as large as that of the first to N-th images, to the first to N-th images, respectively, and
   plane-sequentially multiplexes the first to N-th images to which the dummy images have been multiplexed.

2. The image transmission system according to claim 1, wherein
   each of the first to N-th images is a subframe included in one frame; and
   the time-division display apparatus scans and displays each of the first to N-th images with a speed equal to the speed of displaying and scanning an image corresponding to one subframe during a one-subframe period.

3. The image transmission system according to claim 1, wherein
   the time-division display apparatus comprises a liquid crystal panel that includes;
   multiple scanning lines and multiple signal lines that intersect with one another,
   a scanning line driver that controls a signal inputted to the multiple scanning lines,
   a signal line driver that controls a signal inputted to the multiple signal lines, multiple liquid crystal pixels and multiple accumulation capacities that are provided at positions of intersections by the multiple scanning lines and the multiple signal lines in a matrix shape, and multiple thin film transistors that are provided corresponding to the multiple liquid crystal pixels and the multiple accumulation capacities, in a manner in which either a drain or a source is connected to the signal line and the other drain or source is connected to the corresponding accumulation capacity and the liquid crystal pixel, and a gate is connected to the scanning line; wherein, the scanning line driver controls on/off of the thin film transistors by a scanning signal inputted to the scanning lines; and when the thin film transistors are turned on, the signal line driver applies gradation voltage corresponding to image data of the inputted first to N-th images, to the accumulation capacities and the crystal liquid pixels.

4. The image transmission system according to claim 3, wherein the time-division display apparatus further comprises a backlight that illuminates the liquid crystal panel, turns out the backlight for a Ts1 period shorter than a one-subframe period Ts and applies gradation voltage corresponding to the image data of the first to N-th image data, to the accumulation capacities and the liquid crystal pixels, and turns on the backlight for a period equal to or shorter than the period from Ts to Ts1 within a period other than the Ts1.

5. The image transmission system according to claim 1, wherein the time-division display apparatus comprises a liquid crystal panel that include;

writing control signal lines, multiple scanning lines and multiple signal lines that intersect with one another, a writing control circuit that controls a signal inputted to the writing control signal lines, a scanning line driver that controls a signal inputted to the multiple scanning lines, a signal line driver that controls the signal inputted to the multiple scanning lines, multiple liquid crystal pixels, multiple first accumulation capacities and multiple second accumulation capacities that are provided at positions of intersections by the multiple scanning lines and the multiple signal lines in a matrix shape, multiple first thin film transistors that are provided corresponding to the multiple liquid crystal pixels, the multiple first accumulation capacities and the multiple second accumulation capacities in a manner in which either a drain or a source is connected to the signal line and the other drain or source is connected to the corresponding first accumulation capacity, and a gate is connected to the scanning line, and multiple second thin film transistors that are provided corresponding to the multiple liquid crystal pixels, the multiple first accumulation capacities and the multiple second accumulation capacities in a manner in which either a drain or a source is connected to the corresponding first accumulation capacity and the other drain or source is connected to the corresponding second accumulation capacity and the liquid crystal pixel, and a gate is connected to the writing control signal line; wherein, the scanning line driver controls on/off of the first thin film transistors by a scanning signal inputted to the scanning lines;

when the first thin film transistors are turned on, the signal line driver applies gradation voltage corresponding to image data of the inputted first to N-th images, to the first accumulation capacities;

the writing control circuit controls on/off of the second thin film transistors; and when the second thin film transistors of the whole liquid panel are turned on, the gradation voltage applied to the first accumulation capacities is transferred to the second accumulation capacities and the liquid crystal pixels.

6. The image transmission system according to claim 1, wherein the first to N-th images include a three-dimensional image constituted by at least a right-eye image and a left-eye image;

the time-division display apparatus sequentially displays the right-eye image and the left-eye image by time division, and the image transmission system further comprises an optical shutter constituted by a first shutter corresponding to a right eye and a second shutter corresponding to a left eye, each of which is capable of controlling light transmission/blocking; and the optical shutter causes the first shutter to be in a light transmission state and the second shutter to be in a light blocking state when the right-eye image is displayed on the time-division display apparatus, and causes the second shutter to be in a light transmission state and the first shutter to be in a light blocking state when the left-eye image is displayed on the time-division display apparatus.

7. The image transmission system according to claim 1, wherein the second image among the first to N-th images is a reverse image for negating the first image to cause the first image to be an image uncorrelated with the first image;

the time-division display apparatus sequentially displays at least the first image and the second image for negating the first image by time division, and the image transmission system further comprises an optical shutter capable of controlling transmission/blocking of light; and the optical shutter causes the optical shutter to be in a light transmission state when the first image is displayed on the time-division display apparatus, and causes the optical shutter to be in a light blocking state when the second image is displayed on the time-division display apparatus.

8. The image transmission system according to claim 1, wherein the first to N-th images are images to which temporally adjacent first to N-th frames are assigned, respectively, among moving images with a frame frequency of M×N [Hz].

9. The image transmission system according to claim 1, wherein the time-division display apparatus sequentially displays the first to N-th images, with a frequency of 120 [Hz] or more; and the predetermined image transmission path is a DVI image transmission path, and the frame frequency at the time of transmitting an image is 60 [Hz].

10. The image transmission system according to claim 1, wherein the time-division display apparatus sequentially displays the first to N-th images, with a frequency of 120 [Hz] or more; and the predetermined image transmission path is an HDMI image transmission path, and the frame frequency at the time of transmitting an image is 60 [Hz] or more and 120 [Hz] or less.

11. The image transmission system according to claim 1, wherein the time-division display apparatus sequentially displays the first to N-th images, with a frequency of 120 [Hz] or more; and the predetermined image transmission path is a DisplayPort image transmission path, and the frame frequency at the time of transmitting an image is 60 [Hz] or more and 120 [Hz] or less.

12. An image transmission apparatus transmitting first to N-th (N: an integer of 2 or more) images to a time-division display apparatus which sequentially displays the first to N-th images, with a frequency of M×N [Hz] (M: an integer of 1 or more) by time division, the image transmission apparatus comprising:

a multiplexing unit that plane-sequentially multiplexes the first to N-th images in accordance with the order of displaying the first to N-th images on the time-division display apparatus; and a transmitting unit that transmits the multiplexed images which have been multiplexed by the multiplexing unit to the time-division display apparatus via a predetermined image transmission path with a frame frequency of M [Hz], wherein each of the first to N-th images is a subframe included in one frame;

the time-division display apparatus scans and displays each of the first to N-th images with a speed K times (K: a real number satisfying 1<K) as fast as the speed of displaying and scanning an image corresponding to one subframe during a one-subframe period; and the multiplexing unit plane-sequentially multiplexes dummy images with the number of pixels K−1 times as large as that of the first to N-th images, to the first to N-th images, respectively, and plane-sequentially multiplexes the first to N-th images to which the dummy images have been multiplexed.

13. A method by an image transmission apparatus transmitting first to N-th (N: an integer of 2 or more) images to a time-division display apparatus which sequentially displays the first to N-th images, with a frequency of M×N [Hz] (M: an integer of 1 or more) by time division, the method comprising:

a multiplexing step of plane-sequentially multiplexing the first to N-th images in accordance with the order of displaying the first to N-th images on the time-division display apparatus; and a transmission step of transmitting the multiplexed images which have been multiplexed by the multiplexing unit to the time-division display apparatus via a predetermined image transmission path with a frame frequency of M [Hz], wherein each of the first to N-th images is a subframe included in one frame;

the time-division display apparatus scans and displays each of the first to N-th images with a speed K times (K: a real number satisfying 1<K) as fast as the speed of displaying and scanning an image corresponding to one subframe during a one-subframe period; and in the multiplexing step plane-sequentially multiplexes dummy images with the number of pixels K−1 times as large as that of the first to N-th images, to the first to N-th images, respectively, and plane-sequentially multiplexes the first to N-th images to which the dummy images have been multiplexed.

* * * * *